(12) United States Patent
Ser et al.

(10) Patent No.: US 10,619,870 B2
(45) Date of Patent: Apr. 14, 2020

(54) HUMID AIR FORMING DEVICE, INSPECTION DEVICE COMPRISING SAME, AND INSPECTION METHOD

(71) Applicant: KOH YOUNG TECHNOLOGY INC., Seoul (KR)

(72) Inventors: Jang Il Ser, Gapyeong-gun (KR); Hyo Bin Kim, Incheon (KR); Yong Seung Shin, Seoul (KR); Hong Ki Kim, Yongin-si (KR); Ho Jun Lee, Bucheon-si (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 0 days.

(21) Appl. No.: 15/735,016

(22) PCT Filed: Jun. 8, 2016

(86) PCT No.: PCT/KR2016/006079
§ 371 (c)(1),
(2) Date: Dec. 8, 2017

(87) PCT Pub. No.: WO2016/200155
PCT Pub. Date: Dec. 15, 2016

(65) Prior Publication Data
US 2018/0320913 A1    Nov. 8, 2018

(30) Foreign Application Priority Data

Jun. 8, 2015  (KR) .................... 10-2015-0080674
Jun. 30, 2015 (KR) .................... 10-2015-0093565
May 13, 2016 (KR) .................... 10-2016-0058954

(51) Int. Cl.
*F24F 6/12*     (2006.01)
*G01B 11/25*    (2006.01)
(Continued)

(52) U.S. Cl.
CPC ............. *F24F 6/12* (2013.01); *B01F 3/022* (2013.01); *B01F 5/0485* (2013.01); *B01L 1/04* (2013.01);
(Continued)

(58) Field of Classification Search
CPC .......... F25B 21/02; F25B 41/00; G01B 11/25; G01B 11/2513; B01F 5/0485;
(Continued)

(56) References Cited

U.S. PATENT DOCUMENTS 5,873,356 A * 2/1999 Vossler .................... F23B 1/38
110/203
6,421,931 B1 * 7/2002 Chapman ................ F26B 17/04
34/210
(Continued)

FOREIGN PATENT DOCUMENTS

CN    101404867    4/2009
CN    201648504    11/2010
(Continued)

OTHER PUBLICATIONS

International Search Report for International Application No. PCT/KR2016/006079, dated Sep. 7, 2016.
(Continued)

*Primary Examiner* — Sang H Nguyen
(74) *Attorney, Agent, or Firm* — Kile Park Reed & Houtteman PLLC

(57) ABSTRACT

A humid air forming device, which cools an object to be measured to a predetermined temperature, and which sprays humid air having a predetermined temperature to the cooled object to be measured, thereby forming moisture particles on the surface of the object to be measured, and a measurement system including the same. The humid air forming device includes a cooling unit that cools the object to be measured (Continued)

to a first temperature or lower; and a humid air supply unit that forms humid air having a second temperature, which is higher than the first temperature, and spraying the humid air toward the surface of the cooled object to be measured, thereby forming moisture particles on the surface of the cooled object to be measured.

16 Claims, 17 Drawing Sheets

(51) Int. Cl.

| | | |
|---|---|---|
| *F25B 21/02* | (2006.01) | |
| *F25B 41/00* | (2006.01) | |
| *G01N 21/958* | (2006.01) | |
| *B01F 5/04* | (2006.01) | |
| *B01F 3/02* | (2006.01) | |
| *B01L 1/04* | (2006.01) | |
| *G01N 21/84* | (2006.01) | |
| *F28C 3/08* | (2006.01) | |

(52) U.S. Cl.
CPC .............. *F25B 21/02* (2013.01); *F25B 41/00* (2013.01); *G01B 11/25* (2013.01); *G01B 11/2513* (2013.01); *G01N 21/958* (2013.01); B01L 2200/147 (2013.01); B01L 2300/024 (2013.01); B01L 2300/10 (2013.01); B01L 2300/18 (2013.01); B01L 2300/1894 (2013.01); *F28C 3/08* (2013.01); *G01N 2021/845* (2013.01)

(58) Field of Classification Search
CPC ...... B01F 3/022; B01L 1/04; B01L 2200/147; B01L 2300/024; B01L 2300/10; B01L 2300/18; B01L 2300/1894; G01N 21/958; G01N 2021/845; F24F 26/12; F28C 3/08
See application file for complete search history.

(56) References Cited

U.S. PATENT DOCUMENTS

| | | | |
|---|---|---|---|
| 7,492,437 B2 | 2/2009 | Moon et al. | |
| 9,256,141 B2 | 2/2016 | Yamaguchi et al. | |
| 2003/0194506 A1* | 10/2003 | Drzal .................... | B05D 3/062 |
| | | | 427/553 |
| 2007/0132470 A1* | 6/2007 | Kamakura ............ | H01S 5/0014 |
| | | | 324/750.08 |
| 2007/0142532 A1* | 6/2007 | Lee ....................... | B01D 53/261 |
| | | | 524/436 |
| 2009/0126222 A1* | 5/2009 | Bae ....................... | D06F 39/008 |
| | | | 34/527 |
| 2017/0045427 A1* | 2/2017 | Zenhausern ........ | G01B 11/0616 |

FOREIGN PATENT DOCUMENTS

| | | |
|---|---|---|
| CN | 101571355 | 5/2011 |
| CN | 202375013 | 12/2011 |
| CN | 202925061 | 5/2013 |
| DE | 195 06 642 | 3/1996 |
| DE | 10 2004 025 490 | 12/2005 |
| EP | 2 801 787 | 11/2014 |
| JP | 05-240709 | 9/1993 |
| JP | 08-139065 | 5/1996 |
| JP | 2009-294108 | 12/2009 |
| JP | 2011-233573 | 11/2011 |
| KR | 10-2002-0046053 | 6/2002 |
| KR | 2006-0133380 | 12/2006 |
| KR | 10-2010-0050077 | 5/2010 |
| KR | 10-1039614 | 6/2011 |
| KR | 10-2011-0119083 | 11/2011 |
| KR | 10-2012-0013206 | 2/2012 |
| WO | 02/066924 | 8/2002 |

OTHER PUBLICATIONS

European Office Action for European Application No. 16 807 795.6, dated Oct. 26, 2018.
Chinese Office Action corresponding to Application No. 201680033628.9, dated Jul. 3, 2019.
Chinese Office Action, with English translation, corresponding to Chinese Application No. 201680033628.9. dated Mar. 2, 2020.

* cited by examiner

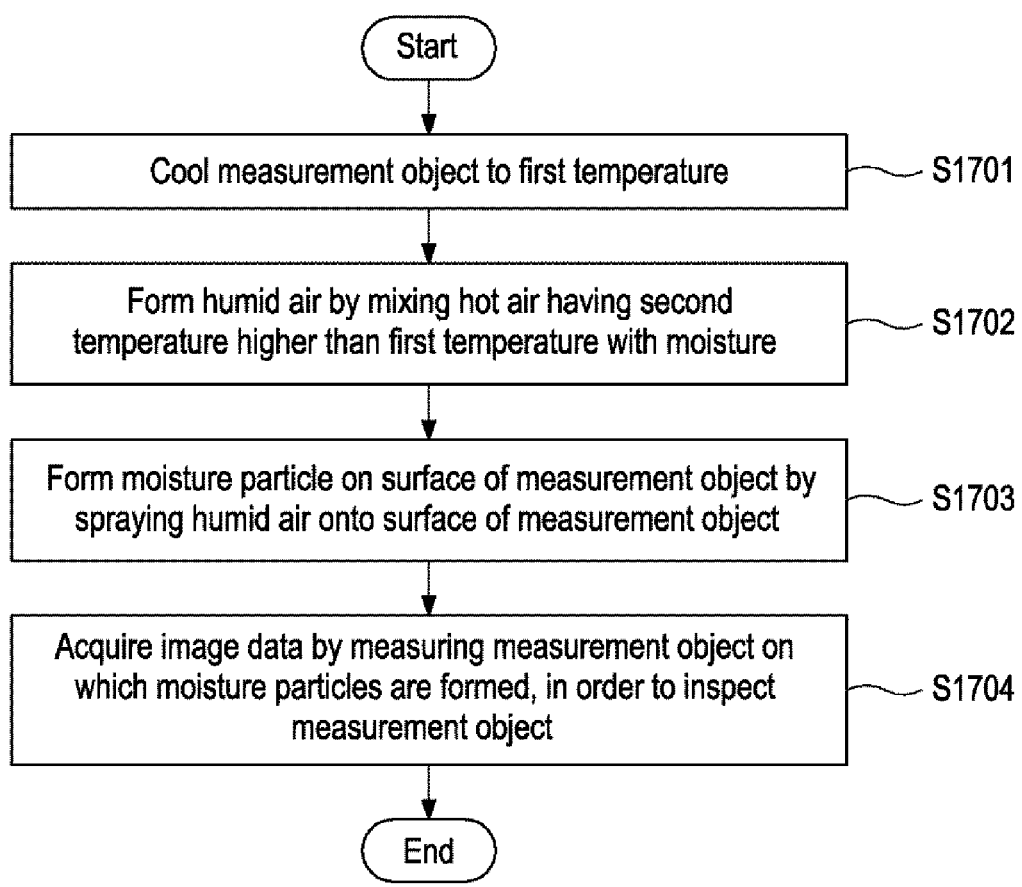

HUMID AIR FORMING DEVICE, INSPECTION DEVICE COMPRISING SAME, AND INSPECTION METHOD

TECHNICAL FIELD

The present disclosure relates to the field of measurement, and more particularly, to a humid air forming device, an inspection device including the same, and an inspection method.

BACKGROUND ART

Generally, in a measurement system, an illumination unit forms and radiates grid pattern light to a measurement object, and an imaging unit receives light reflected from the measurement object and measures the shape of the measurement object using the received light.

That is, in order for the measurement system to measure the shape of the measurement object, the light reflected from the measurement object has to be received by the imaging unit. When the light is irregularly reflected from the surface of the measurement object, the irregularly reflected light spreads in all directions. Thus, the imaging unit may receive the reflected light irrespective of the position thereof.

However, when the measurement object has a mirror reflection surface, such as a mirror or a glass surface, on the surface thereof, the light may be regularly reflected from or may pass through the surface. When the light is regularly reflected, it is difficult to sense the light by an imaging unit at a fixed position since the regularly reflected light travels only in a predetermined direction. In addition, when the light passes through the measurement object, the amount of light incident on the imaging unit is reduced, and it is difficult to sense the light by the imaging unit at a fixed position. Accordingly, it is difficult to perform an accurate measurement of the measurement object.

SUMMARY

An embodiment of the present disclosure provides a humid air forming device that uniformly forms moisture particles on a surface of a measurement object using a dew condensation phenomenon, and a measurement system including the humid air forming device.

An embodiment of the present disclosure provides an inspection device that performs inspection by uniformly forming moisture particles on a surface of a measurement object using the dew condensation phenomenon in order to perform inspection.

An embodiment of the present disclosure provides a humid air forming device that causes closed circulation of humid air through a wind path, and a measurement system including the humid air forming device.

An embodiment of the present disclosure provides a humid air forming device that maintains the temperature and humidity held therein by turning on/off a heater, a hot air blower, or a humidifier from time to time, thereby extending the lifetime of the humid air forming device, and reducing the supplied amount of moisture and the power consumption of the humidifier, and also provides a measurement system including the humid air forming device.

An embodiment of the present disclosure provides a humid air forming device that, when a measurement (or inspection) is stopped temporarily during the driving of an in-line facility, generates humid air without discharging the humid air and extends the off time of a heater, a hot air blower, or a humidifier so that the lifetime of the device is extended, and also provides a measurement system including the humid air forming device.

A humid air forming device according to an exemplary embodiment of the present disclosure includes a humid air supply unit configured to form humid air by mixing hot air having a temperature that is higher than a temperature of a measurement object with moisture, to spray the humid air onto a surface of the measurement object, and to form moisture particles on the surface of the measurement object.

In an embodiment, the humid air forming device may further include a cooling unit configured to cool the measurement object.

In an embodiment, the cooling unit may include a measurement object loading unit configured to load a plurality of measurement objects thereon, a cold air forming unit configured to form cold air, and a cold air supply pipe configured to connect the measurement object loading unit and the cold air forming unit and to supply the cold air formed in the cold air forming unit into the measurement object loading unit.

In an embodiment, the cooling unit may further include a cold air circulation pipe configured to connect the measurement object loading unit and the cold air forming unit and to circulate the cold air supplied to the measurement object loading unit to the cold air forming unit.

In an embodiment, the humid air supply unit may include a hot air forming unit configured to form hot air, a humidifying unit configured to form the moisture, and a mixing unit configured to form the humid air by mixing the hot air and the moisture.

In an embodiment, the mixing unit may include a case including a first inlet, into which the hot air flows, a second inlet, into which the moisture flows, and a discharge port through which the humid air is discharged and a mixing pipe configured to have a plurality of through holes, through which the moisture that flows from the second inlet passes, and to be connected with the first inlet and the discharge port, and to form the humid air by mixing the hot air that flows from the first inlet and the moisture passing through the through holes.

In an embodiment, the humid air forming device may further include a cooling base configured to cool and hold the measurement object, onto which the humid air is sprayed.

In an embodiment, the cooling base may include a cooling element configured to cool the measurement object, an upper plate installed above the cooling element, and configured to suck and hold the measurement object, and to transfer heat of the measurement object to the cooling element, and a lower plate installed below the cooling element, and configured to dissipate heat generated from the cooling element.

In an embodiment, the cooling base may further include a suction unit configured to suck air through a plurality of perforations such that the measurement object is sucked and held on the upper plate.

In an embodiment, the humid air supply unit may include a wind path configured to circulate the humid air therein in a closed manner, a humidifying unit configured to generate the moisture to be mixed with the humid air and an air spraying unit configured to spray a part of the humid air circulating in the wind path onto the measurement object.

In an embodiment, the humid air supply unit may further include a heater configured to heat the humid air circulating in the wind path to a temperature higher than the temperature of external air.

In an embodiment, the humid air supply unit may further include a mixing unit configured to mix the humid air and the moisture formed by the humidifying unit.

In an embodiment, the humid air supply unit may further include an opening/closing unit configured to supply a part of the humid air, which is confined in the wind path, to the air spraying unit or to block the supply of the part of the humid air.

In an embodiment, the humid air supply unit may further include a humid air buffer unit configured to receive and store a part of the humid air, which is confined in the wind path, and to supply the stored humid air to the wind path.

In an embodiment, the humid air supply unit may further include an air circulation unit configured to circulate the humid air in the wind path.

In an embodiment, the humid air supply unit may further include a humid air sensing unit configured to sense a temperature and a humidity of the humid air, and the humid air forming device may further include a controller configured to control formation and spraying of the humid air. The controller may control driving of the heater and the humidifying unit based on the sensed temperature and humidity.

In an embodiment, the humid air forming device may further include a controller configured to control formation and spraying of the humid air, and the controller may control driving of the heater and the humidifying unit based on whether or not the air spraying unit is driven, or based on the number of times of driving of the air spraying unit.

An inspection device according to an embodiment of the present disclosure may include: a humid air forming device comprising a humid air supply unit configured to form humid air by mixing hot air having a temperature that is higher than a temperature of a measurement object and moisture, to spray the humid air onto a surface of the measurement object, and to form moisture particles on the surface of the measurement object and an image data acquisition unit configured to irradiate light toward the measurement object, onto which the humid air is sprayed, to receive light reflected from the measurement object, to acquire image data of the measurement object, in order to inspect the measurement object.

In an embodiment, the humid air forming device may further include a cooling unit configured to cool the measurement object.

An inspection method performed by an inspection device according to an exemplary embodiment of the present disclosure, may include forming humid air by mixing hot air having a temperature higher than a temperature of a measurement object and moisture, forming moisture particles on a surface of the measurement object by spraying the humid air onto the surface of the measurement object and acquiring image data by measuring the measurement object, on which the moisture particles are formed, in order to inspect the measurement object.

According to an embodiment of the present disclosure, moisture particles may be uniformly formed on the surface of a measurement object (e.g., a mirror-surface object), which regularly reflects light or transmits light therethrough, so that a two or three dimensional shape of a mirror-surface object may be measured.

According to an embodiment of the present disclosure, moisture particles may be uniformly formed on the entire surface of the measurement object irrespective of the shape of the measurement object.

According to an embodiment of the present disclosure, moisture particles may be uniformly formed on the surface of a measurement object, and thus, accurate inspection of the measurement object may be performed.

According to an embodiment of the present disclosure, the humid air forming device may hold the humid air while the temperature, the humidity, and the like of the humid air is maintained constant by circulating the humid air through the wind path. Therefore, it is not necessary to continuously generate humid air in order to maintain the temperature, humidity and the like of the humid air constant.

According to an embodiment of the present disclosure, since it is possible to maintain the temperature and humidity of the humid air by turning on/off a heater, a hot air blower, or a humidifier, the lifespan of the apparatus may be increased compared to a type that continuously operates a heater, a hot air blower, or a humidifier. Further, embodiments of the present disclosure may reduce the amount of moisture supplied by a humidifier and reduce power consumption.

In addition, during the driving of an inline facility, there may be a case in which a measurement (or inspection) is temporarily stopped due to a failure occurring in a process, etc. According to an embodiment of the present disclosure, in this case, the lifetime of the apparatus may be increased by generating humid air and maintaining the held humid air without discharging the humid air, and increasing the off time of the heater, the hot air blower, or the humidifier.

BRIEF DESCRIPTION OF THE DRAWINGS

FIG. 17 is a flowchart illustrating a method of performing inspection according to embodiments of the present disclosure.

DETAILED DESCRIPTION

Figure 1:
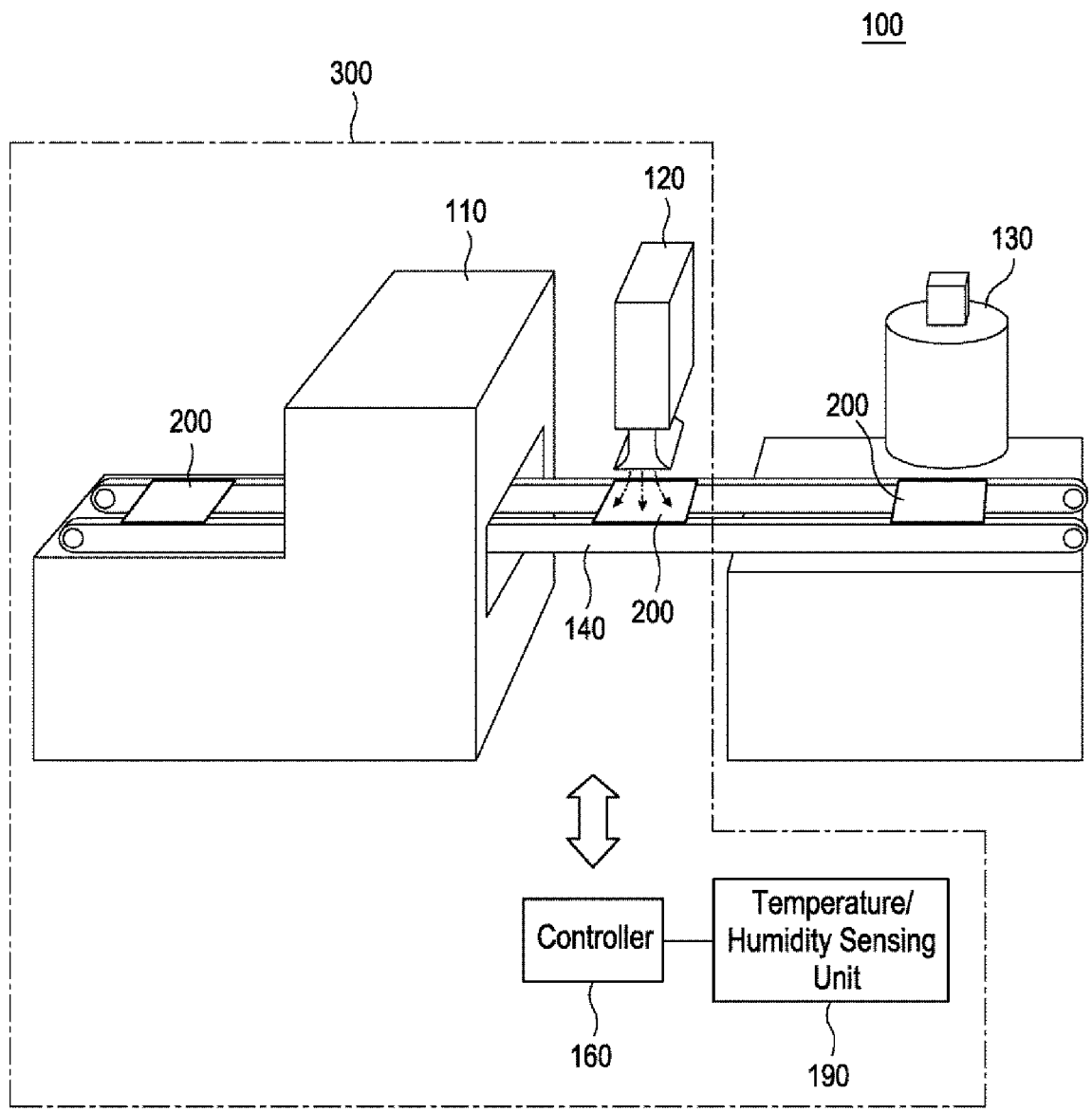
FIG. 1 is a perspective view schematically illustrating the configuration of a measurement system according to embodiments of the present disclosure.

The embodiments of the present disclosure are illustrated for the purpose of describing the present disclosure. The embodiments of the present disclosure may be carried out in various forms, and should not be construed as being limited to the embodiments presented below or to the detailed description of the embodiments.

The term "unit" used in the embodiments may mean software or a hardware component, such as a field-programmable gate array (FPGA), or an application specific integrated circuit (ASIC). However, such a "unit" is not limited to hardware or software. A "unit" may be configured to be provided in an addressable storage medium, and may be configured to be reproduced on one or more processors. Thus, as an example, "units" may include components, such as software components, object-oriented software components, class components, and task components, processors, functions, attributes, procedures, subroutines, program code segments, drivers, firmware, micro-codes, circuits, data, a database, data structures, tables, arrays, and variables. Functions provided in components and units may be combined in a smaller number of components and units or further separated into additional components and units.

All of the technical terms and scientific terms used herein have meaning commonly understood by a person ordinarily skilled in the art to which the present disclosure belongs, unless otherwise defined. All of the terms used in the present specification are selected for the purpose of more clearly describing the present disclosure, but are not selected to limit the scope of the present disclosure.

In this specification, a singular form includes plural forms unless otherwise stated, which is also applied to the claims.

Terms, such as "first," and "second," used in the various embodiments of the present disclosure are used merely to differentiate components, and do not limit the order, importance, or the like of the corresponding components.

As used herein, the terms "including" and "having" are to be understood as open-ended terms unless specifically described otherwise in the text.

In this specification, the phrase " . . . based on" is used to describe one or more factors affecting determination, but the expression does not exclude additional factors used in determination.

When a certain element is described as being "connected" or "joined" to another element, the element may be directly connected or joined to the other element, but it is to be understood that another new component may exist between the certain component and the other component.

As used herein, the term "humid air (moist air)" refers to air containing water vapor.

Hereinafter, embodiments of the present disclosure will be described with reference to the accompanying drawings. Similar components in the drawings will be denoted by similar reference numerals, and redundant descriptions of the same components will be omitted. In the following, detailed descriptions of well-known functions or constructions may be omitted when they may make the subject matter of the present disclosure rather unclear.

FIG. 1 is a perspective view schematically illustrating a measurement system according to an embodiment of the present disclosure. The measurement system may measure a two-dimensional or three-dimensional shape of a measurement object (e.g., a mirror-surface object) (IO). A measurement object 200 may include a mirror reflection surface which may cause light to be regularly reflected therefrom or to transmit therethrough. The measurement object 200 may include, for example, a metal case for a portable terminal, soldering of a semiconductor substrate, a substrate, and the like, but is not limited thereto.

Referring to FIG. 1, a measurement system 100 according to the present embodiment may include a cooling unit 110. The cooling unit 110 may cool the measurement object 200 to be equal to or lower than a predetermined temperature (hereinafter referred to as a "first temperature"). The specific setting of the first temperature will be described in detail below. When the measurement object 200 is cooled by the cooling unit 110, not only the surface of the measurement object 200 but also the air around the surface of the measurement object may be cooled to be equal to or lower than the first temperature. When the humid air around the surface of the measurement object 200 becomes equal to or lower than the first temperature such that the humid air is vapor-saturated or vapor-supersaturated, moisture particles may be generated on the surface of the measurement object 200 due to the occurrence of dew condensation. Considering the installation environment or the like of a conventional measurement device, the first temperature may be in the range of −20° C. to 20° C., in the range of 0° C. to 15° C., or in the range of 2° C. to 5° C.

The measurement system according to the above-described embodiment may include a cooling unit, but is not limited thereto. For example, when the absolute vapor amount in humid air is sufficient even in the state in which the measurement object 200 is not cooled, the air around the surface of the measurement object 200 may be vapor-saturated or vapor-supersaturated according to the psychrometric chart. Accordingly, moisture particles may be generated on the surface of the measurement object 200 due to the occurrence of dew condensation.

Figure 2:
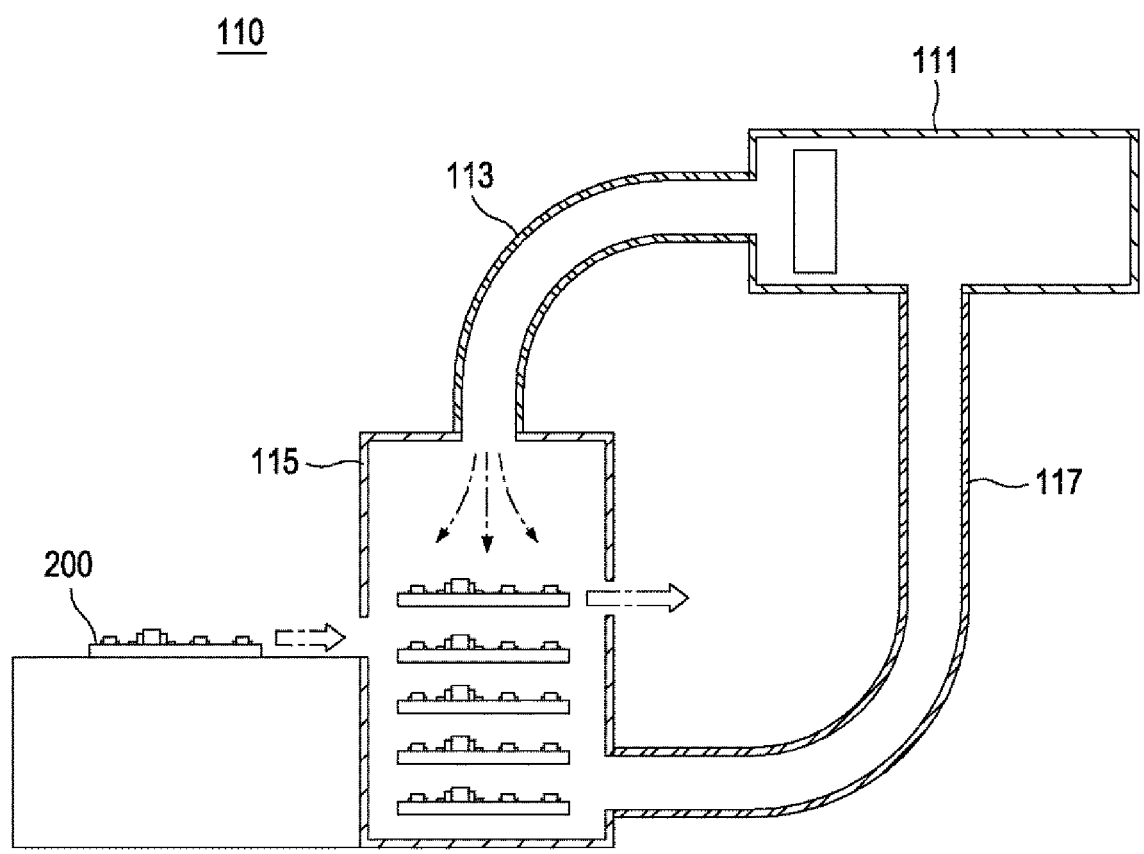
FIG. 2 is a configuration view schematically illustrating the configuration of a cooling unit according to an embodiment of the present disclosure.

FIG. 2 is a configuration view schematically illustrating the configuration of a cooling unit 110 according to an embodiment of the present disclosure. Referring to FIG. 2, the cooling unit 110 may include a measurement object loading unit 115. The measurement object loading unit 115 may temporarily load the measurement object 200. For example, in the measurement object loading unit 115, a plurality of measurement objects 200 may be loaded in multiple stages. For example, the measurement object loading unit 115 may be a hermetically sealed buffer unit that is sealed while the measurement object 200 is not being conveyed.

The cooling unit 110 may further include a cold air forming unit 111. The cold air forming unit 111 may form cold air for cooling the measurement object 200 loaded in the measurement object loading unit 115 to a temperature equal to or lower than the first temperature. For example, the cold air forming unit 111 may include an air conditioner, a freezer, and the like, but is not necessarily limited thereto.

The cooling unit 110 may further include a cold air supply pipe 113. The cold air supply pipe 113 is a pipe for connecting the cold air forming unit 111 and the measurement object loading unit 115, and supplies the cold air formed in the cold air forming unit 111 into the measurement object loading unit 115. For example, one end of the cold air supply pipe 113 may be installed at one side of the upper end of the measurement object loading unit 115. However, without necessarily being limited thereto, the one end of the cold air supply pipe 113 may be installed at various positions in the measurement object loading unit 115, as needed.

The cooling unit 110 may further include a cold air circulation pipe 117. The cold air circulation pipe 117 is a pipe for connecting the measurement object loading unit 115 and the cold air forming unit 111, and may form a circulation structure by supplying the cold air, which is supplied into the measurement object loading unit 115, to the cold air forming unit 111 again. For example, one end of the cold air supply pipe 117 may be installed at one side of the lower end of the measurement object loading unit 115. However, without necessarily being limited thereto, the one end of the cold air supply pipe 117 may be installed at various positions in the measurement object loading unit 115, as needed.

In the above-described embodiment, it has been described that the cooling unit 110 includes the cold air circulation pipe 117, thereby circulating the cold air supplied into the measurement object loading unit 115 to the cold air forming unit 111. However, in another embodiment, the cooling unit 110 does not include the cold air circulation pipe 117, and may discharge the cold air, which is supplied into the measurement object loading unit 115, through an exhaust port formed on a side surface of the lower end of the measurement object loading unit 115.

Referring to FIG. 1 again, the measurement system 100 may further include a humid air supply unit 120. The humid air supply unit 120 may form humid air and spray the humid air onto the surface of the measurement object 200. The humid air may have a temperature higher than the first temperature of the cooling unit 110. When the humid air is applied to the measurement object 200, the humid air may be cooled by the temperature of the surface of the measurement object 200. At this time, when the humid air is cooled and reaches a saturated state or a supersaturated state according to the psychrometric chart, vapor may condense on the surface of the measurement object 200, thereby generating moisture particles.

In one embodiment, the humid air supply unit 120 may spray the humid air continuously or discontinuously. For example, the humid air supply unit 120 may detect the position of the measurement object 200, and may spray the humid air when the measurement object 200 is located at a predetermined position. For example, the humid air supply unit 120 may spray the humid air when the measurement object 200 is located below the humid air supply unit 120. For another example, the humid air supply unit 120 may continuously spray the humid air regardless of the position of the measurement object 200.

In one embodiment, the humid air supply unit 120 may be located on the upper end of the measurement object 200 in order to spray humid air having a predetermined humidity onto the entire surface of the measurement object 200. However, the present disclosure is not necessarily limited thereto.

Figure 3:
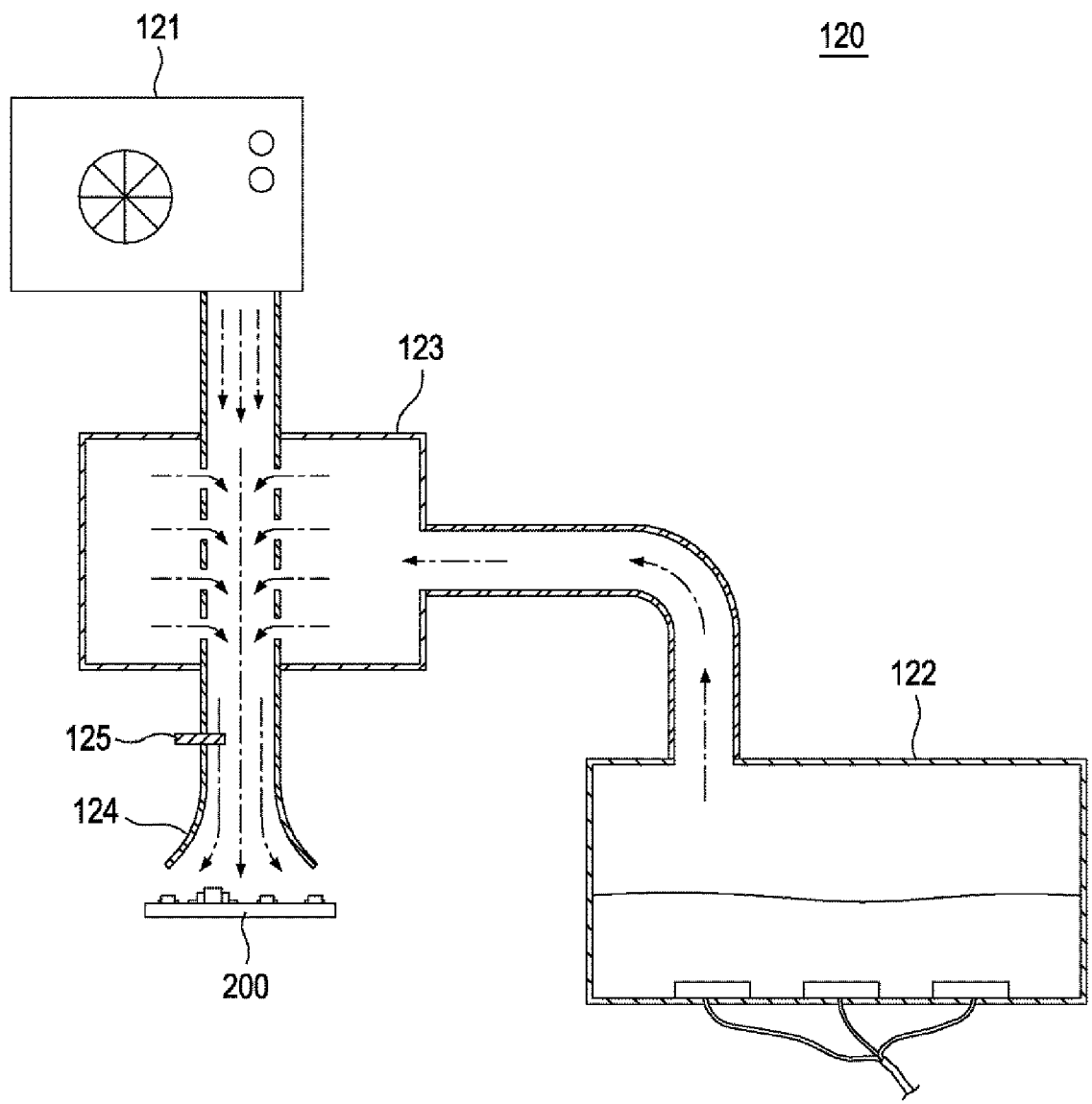
FIG. 3 is a configuration view schematically illustrating the configuration of a humid air supplying unit according to an embodiment of the present disclosure.

FIG. 3 is a configuration view schematically illustrating the configuration of a humid air supply unit 120 according to an embodiment of the present disclosure. Referring to FIG. 3, the humid air supply unit 120 may include a hot air forming unit 121.

The hot air forming unit 121 may form hot air having a temperature equal to or higher than a predetermined temperature (second temperature). The second temperature may be higher than the first temperature of the cooling unit 110. Considering the installation environment or the like of a conventional measurement device, the second temperature may be in the range of 20° C. to 300° C., in the range of 30° C. to 200° C., or in the range of 40° C. to 150° C. In one embodiment, the hot air forming unit 121 may include an electric hot air blower. However, without being limited thereto, any apparatus may be used as long as it may form hot air.

The humid air supply unit 120 may further include a humidifying unit 122. The humidifying unit 122 may form moisture (or fine water droplets) using liquid. In one embodiment, the liquid may be water, but is not necessarily limited thereto. In one embodiment, the humidifying unit 122 includes an ultrasonic humidifier. However, without being limited thereto, any apparatus may be used as long as it may form moisture.

The humid air supply unit 120 may further include a mixing unit 123. The mixing unit 123 may form the humid air by mixing the hot air provided from the hot air forming unit 121 and the moisture supplied from the humidifying unit 122.

Figure 4:
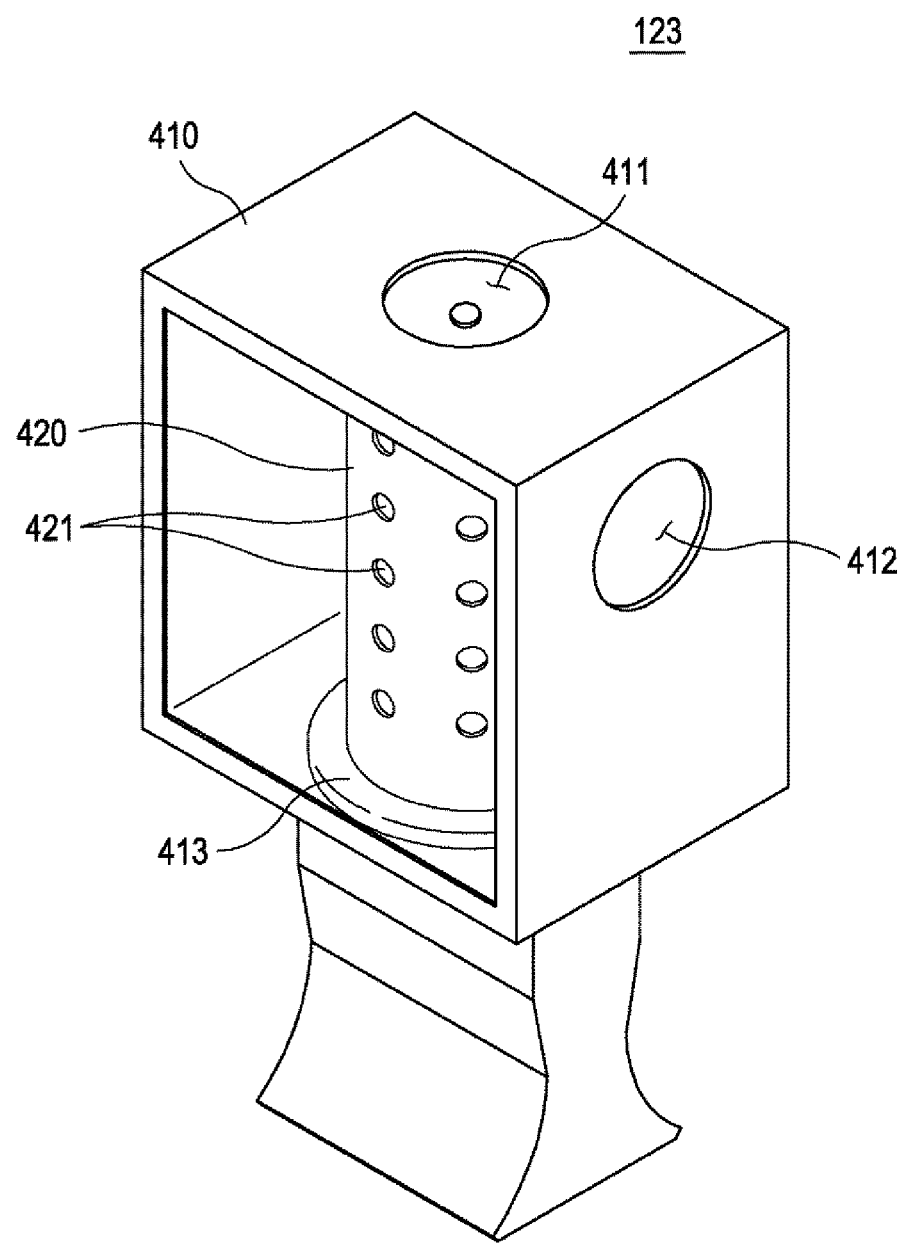
FIG. 4 is a perspective view of a mixing unit according to an embodiment of the present disclosure.
Figure 5:
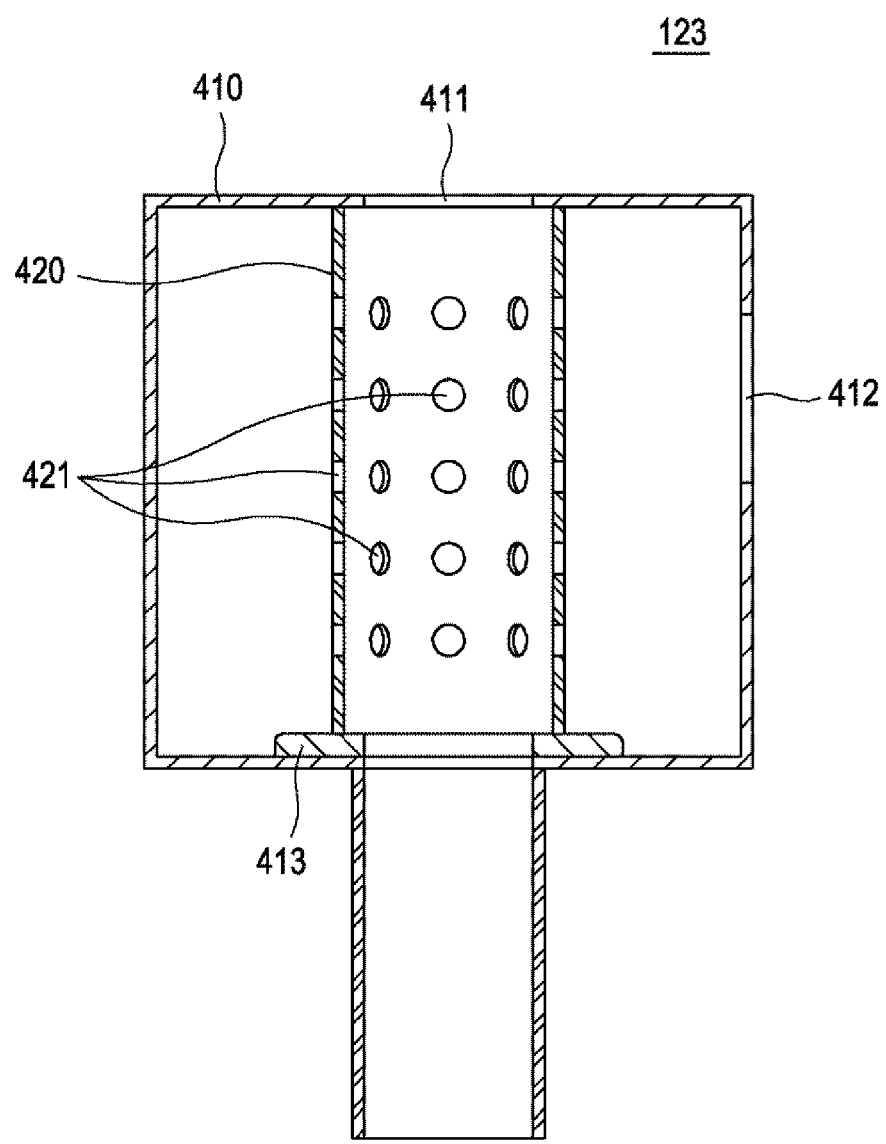
FIG. 5 is a cross-sectional view of the mixing unit according to the embodiment of the present disclosure.

FIG. 4 is a perspective view of a mixing unit 123 according to an embodiment of the present disclosure, and FIG. 5 is a cross-sectional view of the mixing unit 123 according to the embodiment of the present disclosure. Referring to FIGS. 4 and 5, the mixing unit 123 may include a case 410.

The case 410 may seal the hot air provided from the hot air forming unit 121 and the moisture provided from the humidifying unit 122. The case 410 may include a hot air inlet 411 into which hot air from the hot air forming unit 121 flows, a moisture inlet 412 into which the moisture from the humidifier 122 flows, and a discharge port 413 through which the humid air is discharged.

The mixing unit 123 may further include a mixing pipe 420. The mixing pipe 420 may be connected to the hot air inlet 411 and the discharge port 413 of the case 410. In addition, the mixing pipe 420 may have a plurality of through holes 421. The diameter of the through holes 421 may be in the range of 1 mm to 10 mm, but is not limited thereto. Further, the mixing pipe 420 may have a cylindrical shape, but is not limited thereto.

In one embodiment, the hot air formed by the hot air forming unit 121 may flow into the mixing pipe 420 through the hot air inlet 411 of the case 410. In addition, the moisture formed by the humidifying unit 122 may be flowed into the mixing pipe 420 via the moisture inlet 412 of the case 410 and through the through holes 421 therein. Therefore, in the mixing pipe 420, the hot air and the moisture may be mixed to form humid air.

Referring to FIG. 3 again, the humid air supply unit 120 may further include a nozzle 124. The nozzle 124 is connected to the discharge port 413 of the case 410, may spray the humid air formed in the mixing unit 123 onto the surface of the measurement object 200. In one embodiment, the nozzle 124 may be installed at the upper end of the measurement object 200. However, without necessarily being limited thereto, the nozzle 124 may be installed at any position so long as the nozzle 124 may uniformly spray the humid air onto the surface of the measurement object 200. In addition, the nozzle 124 may be configured as a plurality of nozzles in order to spray the humid air in various directions.

The humid air supply unit 120 may further include a humid air sensing unit 125. The humid air sensing unit 125 may be installed at a predetermined position within the humid air supply unit 120, sense the temperature and humidity of the humid air sprayed by the humid air supply unit 120, and form sensing information (hereinafter, referred to as "humid air sensing information") including the sensed temperature and humidity. For example, the humid air sensing unit 125 may include a temperature/humidity sensor, but is not limited thereto.

Referring to FIG. 1 again, the measurement system 100 may further include an image data acquisition unit 130. The image data acquisition unit 130 irradiates light to the measurement object 200, on the surface of which moisture particles are generated, receives the light reflected by the measurement object 200 and acquires image data of the measurement object 200. The image data may be two-dimensional or three-dimensional image data of the measurement object 200.

Figure 6:
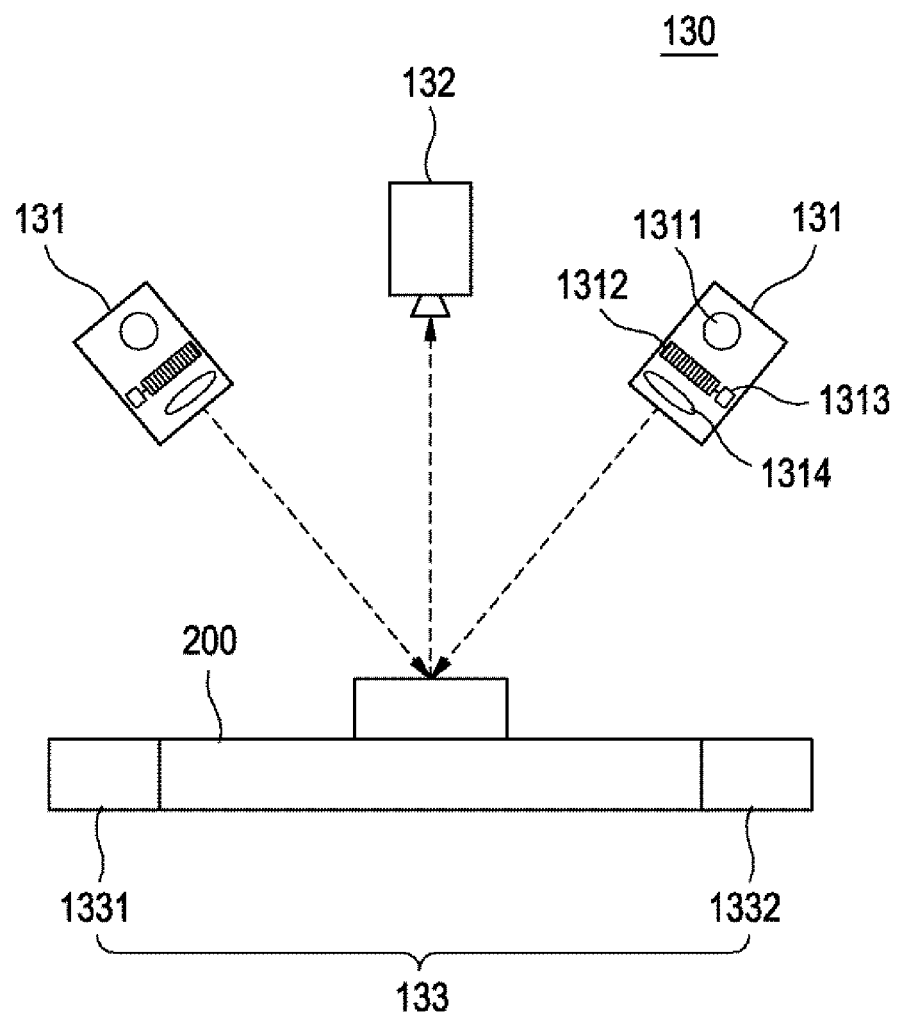
FIG. 6 is an explanatory view schematically illustrating an image data acquisition unit according to an embodiment of the present disclosure.

FIG. 6 is an explanatory view schematically illustrating an image data acquisition unit 130 according to an embodiment of the present disclosure. Referring to FIG. 6, the image data acquisition unit 130 may include an illumination unit 131.

The illumination unit 131 may irradiate pattern light for measuring the shape of the measurement object 200 to the measurement object 200. For example, the illumination unit 131 may include a light source 1311 configured to generate light, a grid element 1312 configured to convert the light from the light source 1311 into a pattern illumination, a grid transfer apparatus 1313 configured to pitch-transfer the grid element 1312, and a projection lens 1314 configured to project the pattern illumination, which is converted by the grid element 1312, onto the measurement object 200. Here, the grid element 1312 may be transferred by a predetermined distance (e.g., 2π/N (where N is a natural number of 2 or more)) through the grid transfer apparatus 1313, such as a Lead Zirconate Titanate (PZT) actuator. Alternatively, instead of using the grid element 1312 and the grid transfer apparatus 1313, phase-shifted grid pattern light may be irradiated by using an image of a liquid crystal display device. However, without necessarily being limited thereto, this may also be implemented by other units or devices so long as the units or devices may irradiate the phase-shifted grid pattern light.

As an example, one illumination unit 131 may be installed or a plurality of illumination units 131 may be installed to be spaced apart by a predetermined angle along a circumferential direction or a virtual polygonal plane. As another example, a plurality of illumination units 131 may be installed to be inclined at a constant angle with respect to a direction that is vertical to the measurement object 200. As still another example, one illumination unit 131 may be installed along a direction that is vertical to the measurement object 200.

The image data acquisition unit 130 may further include an imaging unit 132. The imaging unit 132 may receive the light reflected by the measurement object 200 and may acquire image data of the measurement object 200. That is, the imaging unit 132 may acquire image data of the measurement object 200 by imaging the measurement object 200 through the irradiation of the pattern light of the illumination unit 131. The imaging unit 132 includes a charge-coupled device (CCD) camera or a complementary metal oxide semiconductor (CMOS) camera, but is not necessarily limited thereto. As an example, the imaging unit 132 may be installed at an upper vertical position from the measurement object 200. As another example, a plurality of imaging units 132 may be installed at an upper vertical position from the measurement object 200 and be installed to be spaced apart from each other at a predetermined angle along the circumferential direction.

The image data acquisition unit 130 may further include a stage 133. The stage 133 may support and fix the measurement object 200. In one embodiment, the stage 133 may include a first stage 1331, which operates to support and fix one end of the measurement object 200, and a second stage 1332, which operates to support and fix the other end of the measurement object 200.

Since the image data acquisition unit 130 illustrated in FIG. 6 represents one embodiment of measurement devices capable of acquiring image data of the measurement object 200, the image data acquisition unit 130 is not necessarily limited to the form illustrated in FIG. 6.

Referring to FIG. 1 again, the measurement system 100 may further include a transfer unit 140. The transfer unit 140 may transfer the measurement object 200 to the cooling unit 110, the humid air supply unit 120, and the image data acquisition unit 130. In one embodiment, the transfer unit 140 may transfer the measurement object 200 in one direction. The transfer unit 140 may include a conveyor, but is not necessarily limited thereto.

The measurement system 100 may further include a temperature/humidity sensing unit 190. The temperature/humidity sensing unit 190 may sense at least one of temperature and humidity, and may output sensing information. The temperature/humidity sensing unit 190 may be installed at a predetermined position in the measurement system 100, may sense at least one of the temperature and the humidity of the air around the measurement system 100 and may output sensing information (hereinafter, referred to as "temperature/humidity sensing information") including at least one of the sensed temperature and humidity. For example, the temperature/humidity sensing unit 190 may include a temperature sensing unit and a humidity sensing unit. The temperature sensing unit may include a temperature sensor or the like, but is not limited thereto. The humidity sensing unit may include a humidity sensor or the like, but is not limited thereto. As another example, the temperature/humidity sensing unit 190 may include a temperature/humidity sensor that is configured to sense temperature and humidity without separately including the temperature sensing unit and the humidity sensing unit.

The measurement system 100 may further include a controller 160. The controller 160 may control the operation of each of the components of the measurement system 100, that is, the cooling unit 110, the humid air supply unit 120, the image data acquisition unit 130, the transfer unit 140, and the temperature/humidity sensing unit 190.

As an example, the controller 160 may adjust the first temperature of the cooling unit 110 and the second temperature of the humid air supply unit 120 based on the temperature/humidity sensing information provided from the temperature/humidity sensing unit 190. That is, the controller 160 may set the first temperature and the second temperature based on the temperature/humidity sensing information, may adjust, based on the first set temperature, the temperature of the measurement object 200 cooled by the cooling unit 110, and may adjust, based on the second set temperature, the temperature of the humid air supplied from the humid air supply unit 120. In addition, the controller 160 may control the humidification amount of the humidifying unit 122 and to adjust the humidity of the humid air supplied from the humid air supply unit 120.

As an example, the controller 160 may calculate the dew point temperature at which dew condensation may occur by applying the temperature and humidity information of the humid air to the psychrometric chart. For example, the controller 160 may calculate the dew point temperature by applying the temperature and humidity information of the humid air sensed by the humid air sensing unit 125 to the psychrometric chart, and may set the first temperature to be equal to or lower than the dew point temperature. For example, when the temperature of the humid air is 20° C. and the humidity of the humid air is 50%, the controller 160 may apply the temperature and humidity to the psychrometric chart, and may calculate the dew point temperature of 9° C. Accordingly, the controller 160 may set the first temperature to be equal to or lower than 9° C. As still another example, the controller 160 may calculate the dew point temperature by applying the temperature and humidity of the ambient air of the measurement system 100 sensed by the temperature/humidity sensing unit 190 to the psychrometric chart, and may set the first temperature to be equal to or lower than the dew point temperature of the ambient air. The controller 160 may output a control signal for adjusting the temperature, to which the cooling unit 110 cools the measurement object 200, to be equal to or lower than the first temperature. Accordingly, the cooling unit 110 may cool the measurement object 200 to be equal to or lower than the first temperature in accordance with the control signal from the controller 160.

In addition, the controller 160 may adjust the first temperature of the cooling unit 110 based on the temperature/humidity sensing information of the ambient air, which is provided from the temperature/humidity sensing unit 190. For example, when it is determined that the moisture particles formed on the surface of the measurement object 200 are difficult to maintain until the image data is acquired according to the temperature/humidity sensing information of the ambient air, the controller 160 sets the first temperature to a lower value. For example, when the cooling of the measurement object 200 is not sufficiently maintained until the image data of the measurement object 200 is acquired and thus, the air around the surface of the measurement object 200 goes into a vapor-unsaturated state according to the psychrometric chart, and moisture particles formed on the surface of the measurement object 200 may be evaporated. Therefore, when the controller 160 sets the first temperature to be sufficiently low such that the air around the surface of the measurement object 200 maintains a vapor-saturated state or vapor-supersaturated state until the image data of the measurement object 200 is acquired, the moisture particles may be maintained on the surface of the measurement object for a sufficient amount of time.

As another example, the controller 160 may set the second temperature based on the temperature sensing information, that is, the temperature sensed by the temperature sensing unit. For example, the controller 160 may set the second temperature to be equal to or higher than the temperature sensed by the temperature sensing unit. For example, when the temperature of the ambient air of the measurement system 100 sensed by the temperature sensing unit is 20° C., the controller 160 may set the second temperature to be equal to or higher than the temperature (20° C.) sensed by the temperature sensing unit. As another example, the controller 160 may set the second temperature to be higher than the temperature sensed by the temperature sensing unit by a predetermined temperature. As an example, when the temperature sensed by the temperature sensing unit is 20° C., the controller 160 may set the second temperature to a temperature (30° C.), which is higher than the temperature (20° C.) sensed by the temperature sensing unit by a predetermined temperature (e.g., 10° C.). The controller 160 may output a control signal for adjusting the temperature of the hot air of the humid air supply unit 120 to be equal to or higher than the second temperature. Accordingly, the hot air forming unit 121 of the humid air supply unit 120 may form hot air having a predetermined temperature that is equal to or higher than the second temperature (e.g., 30° C.) in accordance with the control signal from the controller 160.

Also, as described above, the controller 160 may calculate the temperature at which dew condensation may occur, that is, the dew point temperature, by applying the temperature and humidity information of the humid air to the psychrometric chart. As an example, the controller 160 may set the first temperature based on the temperature of the air around the measurement system 100, the second temperature, and the dew point temperature, which are sensed by the temperature sensing unit. For example, the controller 160 may calculate a temperature difference between the second temperature and the temperature sensed by the temperature sensing unit, and may set the first temperature to a temperature obtained by adding the temperature difference to the dew point temperature. As an example, the controller 160 may calculate a temperature difference (10° C.) between the second temperature (30° C.) and the temperature (20° C.) sensed by the temperature sensing unit, and may set the first temperature to a temperature (19° C.) obtained by adding the dew point temperature (9° C.) and the temperature difference (10° C.). The controller 160 may output a control signal for controlling the temperature, to which the cooling unit 110 cools the measurement object 200, to be equal to or lower than the first temperature. Accordingly, the cooling unit 110 may cool the measurement object 200 to be equal to or lower than the first temperature in accordance with the control signal from the controller 160.

In addition, the controller 160 may determine the humidity of the humid air based on the first temperature and the second temperature. For example, the controller 160 may calculate the humidity of the humid air at which dew condensation may occur, that is, the humidity at which moisture particles may be generated on the surface of the measurement object 200 (hereinafter, referred to as "dew condensation occurrence humidity") by applying the first temperature and the second temperature to the psychrometric chart. For example, when the first temperature is 9° C. and the second temperature is 20° C., the dew condensation occurrence humidity is 50%. The controller 160 may compare the humidity sensing information (i.e., the humidity of the humid air) provided from the humid air sensing unit 125 with the dew condensation occurrence humidity, and may determine whether the humidity of the humid air is equal to or higher than the dew condensation occurrence humidity. When the humidity of the humid air is equal to or lower than the dew condensation occurrence humidity, the controller 160 may further operate the humidifying unit 1264.

As an example, the controller 160 may be implemented by a computer system or apparatus, which reads and executes computer-executable instructions recorded on a storage medium (e.g., a non-transitory computer-readable storage medium) in order to perform one or more of the functions described above, and may also be implemented by a method performed by the computer system or apparatus by reading and executing the computer-executable commands from the storage medium in order to perform one or more functions in the embodiment(s) described above. The computer may include one or more of a central processing unit (CPU), a micro-processing unit (MPU), or another circuit, and may include a network of separate computers or separate computer processors. The computer-executable instructions may be provided to a computer from, for example, a network or storage medium. The storage medium may include one or more of, for example, a hard disk, a random-access memory (RAM), a read-only memory (ROM), a storage of a distributed computing system, an optical disk (a compact disc (CD), a digital versatile disk (DVD), or a blue-ray disk (BD)), a flash memory device, a memory card, and the like.

Alternatively, the cooling unit 110 and the humid air supply unit 120 may be configured as a humid air forming device 300 configured to generate moisture particles on the surface of the measurement object 200. Meanwhile, at least one of the transfer unit 140, the controller 160, and the temperature/humidity sensing unit 190 may be included in the humid air forming device 300.

Alternatively, the measurement system 100 may further include a measurement object sensing unit configured to sense the position of the measurement object 200 transferred by the transfer unit 140 and to output position information including the sensed position. The measurement object sensing unit may include a position sensor or the like, but is not limited thereto.

Alternatively, the measurement system 100 may further include a humid air exhaust port configured to exhaust the humid air sprayed from the humid air supply unit 120. As the measurement system 100 includes a humid air exhaust port as described above, it is possible to reduce the possibility of occurrence of trouble or the like in the measurement system 100 due to the humid air sprayed from the humid air supply unit 120.

Further, when the image data of the measurement object 200 is acquired after the spraying of the humid air, too much fogging may occur on the surface of the measurement object 200 (that is, condensation of moisture particles is excessive), or too little fogging may occur (that is, condensation of moisture particles is insufficient), so accurate two-dimensional or three-dimensional shapes may not be derived only with the acquired image data. Alternatively, the controller 160 may adjust the degree to which the humid air is mixed with the external air by adjusting the air volume of hot air sprayed from the hot air forming unit 121 before the setting of the measurement system 100, and may set the optimum air volume. That is, the controller 160 may form a control signal for controlling the air volume of hot air based on the temperature/humidity sensing information sensed through the temperature/humidity sensing unit. Accordingly, the hot air forming unit 121 may adjust the air volume of hot air in accordance with the control signal from the controller 160.

Figure 7:
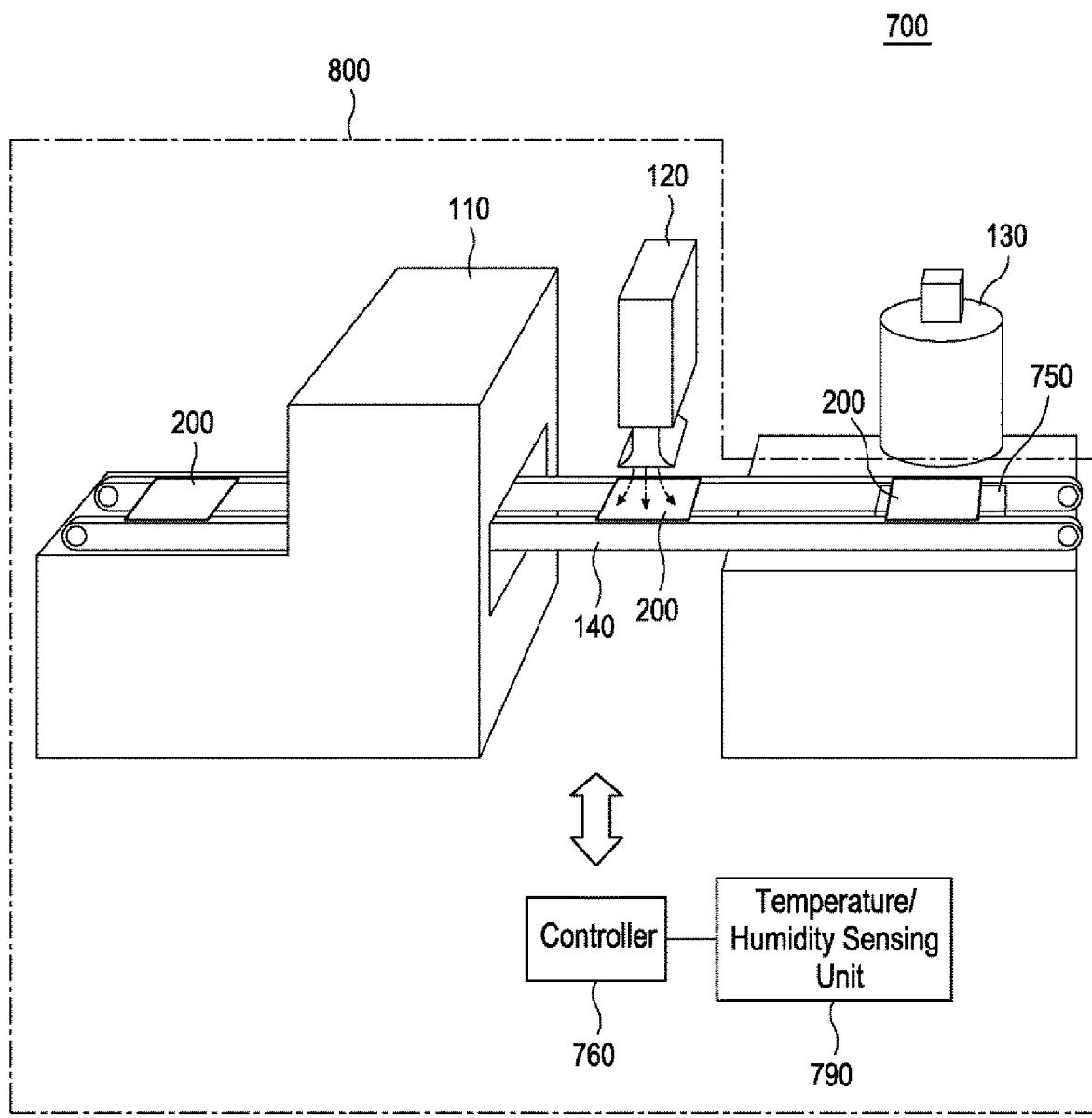
FIG. 7 is a perspective view schematically illustrating a measurement system according to another embodiment of the present disclosure.

FIG. 7 is a perspective view schematically illustrating a measurement system according to an embodiment of the present disclosure. In the present embodiment, elements similar to those described above are denoted by similar reference numerals, and a detailed description thereof will be omitted.

Referring to FIG. 7, the measurement system 700 may include a cooling base 750. The cooling base 750 may cool the measurement object 200, which is transferred by the transfer unit 140 from the humid air supply unit 120, to be equal to or lower than a predetermined temperature (third temperature) for the moisture particles formed on the surface of the measurement object 200 to be maintained. For example, the third temperature may be the first temperature, to which the cooling unit 110 cools the measurement object 200. That is, the cooling base 750 may cool the measurement object 200 for the temperature of the measurement object 200 to be maintained at the first temperature or lower. As another example, the third temperature may be set to a temperature at which the air around the surface of the measurement object 200 goes into a vapor-saturated state or a vapor-supersaturated state. This may be set by applying the temperature/humidity of the ambient air provided from the temperature/humidity sensing unit 790 to the psychrometric chart. When the air around the surface of the measurement object 200 goes into a vapor-saturated state or a vapor-supersaturated state, the moisture particles formed on the surface of the measurement object 200 do not evaporate, so that the moisture particles may be maintained.

Figure 8:
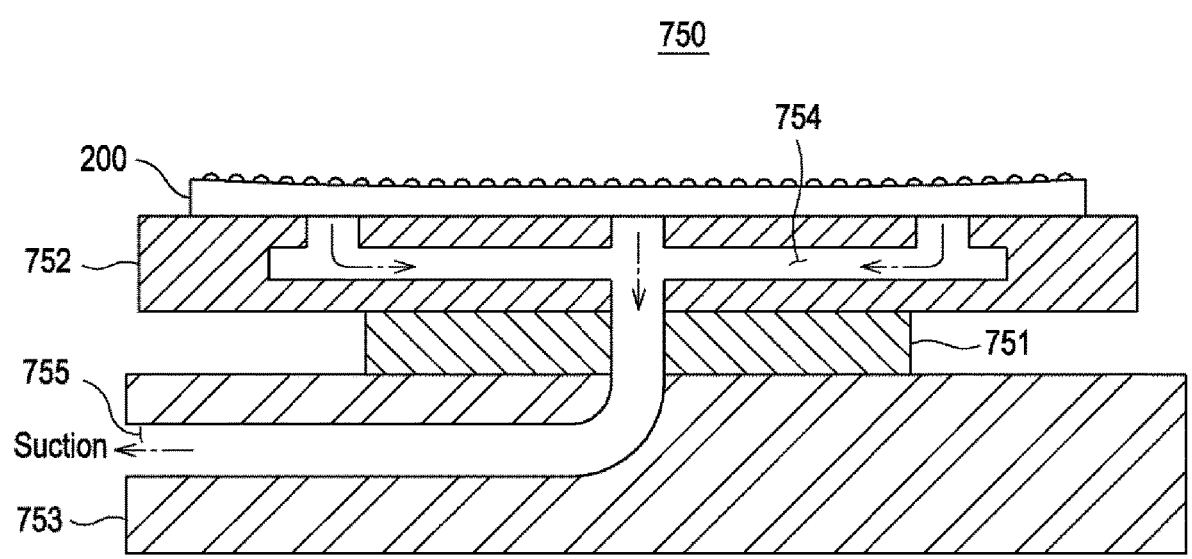
FIG. 8 is a cross-sectional view of the cooling base according to another embodiment of the present disclosure.
Figure 9:
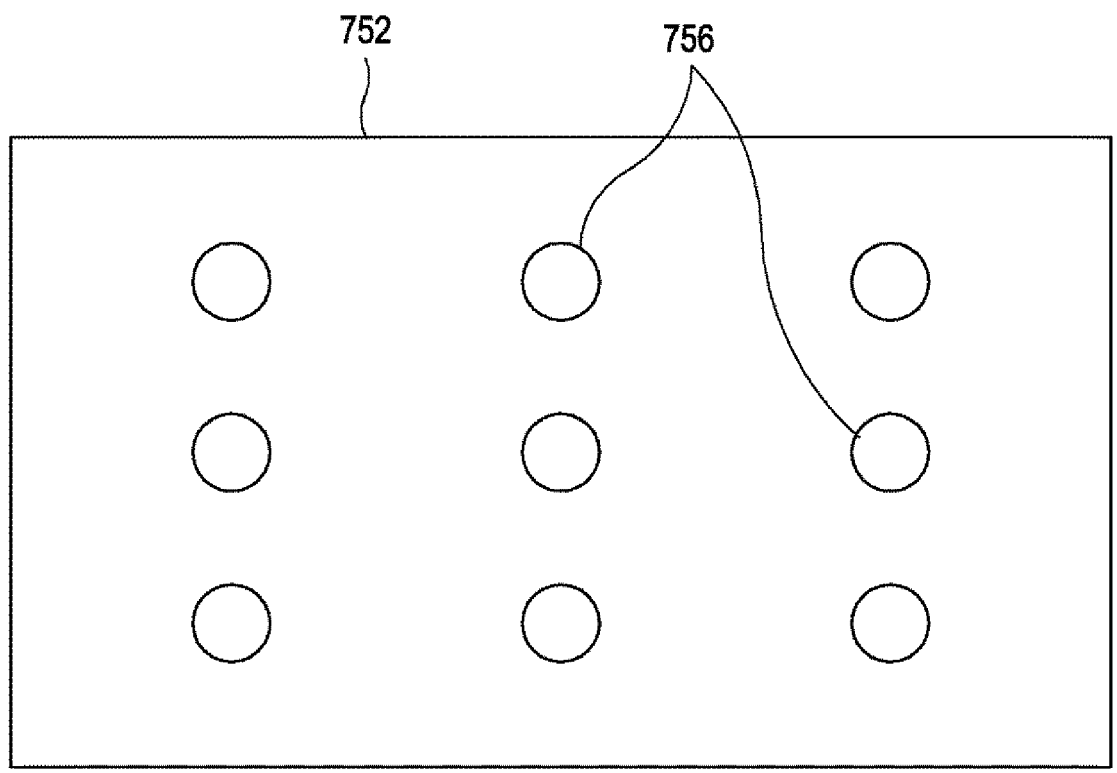
FIG. 9 is a top plan view of the cooling base according to another embodiment of the present disclosure.

FIG. 8 is a cross-sectional view schematically illustrating a cooling base 750 according to one embodiment of the present disclosure, and FIG. 9 is a top plan view of the cooling base 750 according to the embodiment of the present disclosure. Referring to FIG. 8, the cooling base 750 may include a cooling element 751. The cooling element 751 may cool the measurement object 200 to be equal to or lower than the third temperature. For example, the cooling element 751 may include a Peltier element that performs cooling using the Peltier effect, by which heat is absorbed by electric current. However, the cooling element 751 is not necessarily limited thereto.

The cooling base 750 may further include an upper plate 752. The upper plate 752 may hold the measurement object 200 by suction. As illustrated in FIGS. 8 and 9, the upper plate 752 may include a plurality of perforations 756 and a suction pipe 754 configured to suck and hold the measurement object 200 by suction of air. In addition, the upper plate 752 may be located on the cooling element 751, thereby transferring the heat of the measurement object 200 to the cooling element 751. That is, the heat of the measurement object 200 is transferred to the cooling element 751 through the upper plate 752, and the cooling element 751 absorbs the heat, so that the measurement object 200 may be cooled. For example, the upper plate 752 may be made of a material having a high heat transfer rate. As an example, the upper plate 752 may be made of aluminum, but is not limited thereto.

The cooling base 750 may further include a lower plate 753. The lower plate 753 is located below the cooling element 751, and may dissipate the heat generated from the cooling element 751. The lower plate 753 may be connected to the suction pipe 754, and may include a suction pipe 755 for air suction. For example, the lower plate 753 may be made of a material having a high heat transfer rate. As an example, the lower plate 753 may be made of aluminum, but is not limited thereto.

Referring to FIG. 7 again, the measurement system 700 may further include a temperature/humidity sensing unit 790. The temperature/humidity sensing unit 790 senses at least one of temperature and humidity, and outputs sensing information. As an example, the temperature/humidity sensing unit 790 may include a temperature sensing unit and a humidity sensing unit which are installed at predetermined positions in the measurement system 700.

For example, the temperature sensing unit may include a first temperature sensing unit that operates to sense a temperature around the measurement system 700 and to output first temperature sensing information including the sensed temperature, and a second temperature sensing unit that is installed on the cooling base 750 (i.e., the upper plate 752 of the cooling base 750) and senses the temperature of the cooling base 750 and operates to output second temperature sensing information including the sensed temperature.

The measurement system 700 may further include a controller 760. The controller 760 may control the operation of each of the components of the measurement system 700, that is, the cooling unit 110, the humid air supply unit 120, the image data acquisition unit 130, the transfer unit 140, the cooling base 750, and the temperature/humidity sensing unit 790.

As an example, the controller 760 may adjust the first temperature of the cooling unit 110, the second temperature of the humid air supply unit 120, and the third temperature of the cooling base 750 based on the sensing information provided from the temperature/humidity sensing unit 790. That is, the controller 760 may set the first temperature and the second temperature based on the first temperature sensing information provided from the first temperature sensing unit and the humidity sensing information provided from the humidity sensing unit, may adjust, based on the set first temperature, the first temperature of the cooling base 110 and the third temperature of the cooling base 750, and may adjust, based on the set second temperature, the temperature of the humid air supplied from the humid air supply unit 120. In addition, the controller 760 may control the humidification amount of the humidifying unit 122 and control the humidity of the humid air supplied from the humid air supply unit 120.

As an example, the controller 760 may calculate the dew point temperature at which dew condensation may occur by applying the temperature and humidity information of the humid air to the psychrometric chart. For example, the controller 760 may calculate the dew point temperature by applying the temperature and humidity information of the humid air sensed by the humid air sensing unit 125 to the psychrometric chart, and may set the first temperature to be equal to or lower than the dew point temperature. As another example, the controller 760 may calculate the dew point temperature by applying the temperature sensed by the first temperature sensing unit and the humidity sensed by the humidity sensing unit to the psychrometric chart, and may set the first temperature to be equal to or lower than the dew point temperature of the ambient air. The controller 760 may output a control signal for adjusting the temperature, to which the cooling unit 110 cools the measurement object 200, to be equal to or lower than the first temperature. Accordingly, the cooling unit 110 may cool the measurement object 200 to be equal to or lower than the first temperature in accordance with a sixth control signal from the controller 760.

In addition, the controller 760 may compare the temperature sensed by the second temperature sensing unit (i.e., the second temperature sensing information) with the third temperature, and when the temperature sensed by the second temperature sensing unit is higher than the third temperature, the controller 760 may output a control signal for adjusting the temperature of the cooling base 750 to be equal to or lower than the third temperature. Accordingly, the cooling base 750 may cool the measurement object 200 to be equal to or lower than the third temperature in accordance with the control signal from the controller 760.

As another example, the controller 760 may set the second temperature based on the first temperature sensing information. For example, the controller 760 may set the second temperature to be equal to or higher than the temperature sensed by the first temperature sensing unit. As another example, the controller 760 may set the second temperature to be higher than the temperature sensed by the first temperature sensing unit by a predetermined temperature. The controller 760 may output a control signal for adjusting the temperature of the hot air of the humid air supply unit 120 to be equal to or higher than the second temperature. Accordingly, the hot air forming unit 121 of the humid air supply unit 120 may form hot air having a temperature that is equal to or higher than the second temperature in accordance with the control signal from the controller 760.

In addition, the controller 760 may calculate a dew point temperature by applying the first temperature sensing information and the humidity sensing information to the psychrometric chart. The controller 760 may set the first temperature based on the temperature of the air around the measurement system 700, which is sensed by the first temperature sensing unit, the second temperature, and the dew point temperature. For example, the controller 760 may calculate a temperature difference between the temperature sensed by the first temperature sensing unit and the second temperature, and may set the first temperature to a temperature obtained by adding the temperature difference to the dew point temperature. The controller 760 may output a control signal for adjusting the temperature, to which the cooling unit 110 cools the measurement object 200, to be equal to or lower than the first temperature. Accordingly, the cooling unit 110 may cool the measurement object 200 to be equal to or lower than the first temperature in accordance with the control signal from the controller 760.

In addition, the controller 760 may set a predetermined temperature (third temperature), to which the cooling base 750 cools the measurement object 200, to a temperature at which the air around the surface of the measurement object 200 goes into a vapor-saturated state or a vapor-supersaturated state. This may be calculated by applying the temperature/humidity of the ambient air provided from the temperature/humidity sensing unit 790 to the psychrometric chart. When the air around the surface of the measurement object 200 goes into the vapor-saturated state or the vapor-supersaturated state, the moisture particles formed on the surface of the measurement object 200 do not evaporate, so that the moisture particles may be maintained. In addition, the controller 760 may compare the temperature of the cooling base 750 sensed by the second temperature sensing unit (i.e., the second temperature sensing information) with the third temperature, and when the temperature of the cooling base 750 sensed by the second temperature sensing unit is higher than the third temperature, the controller 760 may output a control signal for adjusting the temperature of the cooling base 750 to be equal to or lower than the third temperature. Accordingly, the cooling base 750 may cool the measurement object 200 to be equal to or lower than the third temperature in accordance with the control signal from the controller 760. In this way, when the air around the surface of the measurement object 200 goes into the vapor-saturated state or the vapor-supersaturated state according to the psychrometric chart, the moisture particles formed on the surface of the measurement object 200 do not evaporate, so that the moisture particles may be maintained.

As an example, the controller 760 may be implemented by a computer system or apparatus, which reads and executes computer-executable instructions recorded on a storage medium (e.g., a non-transitory computer-readable storage medium) in order to perform one or more of the functions described above, and may also be implemented by a method performed by the computer system or apparatus by reading and executing the computer-executable commands from the storage medium in order to perform one or more functions in the embodiment(s) described above. The computer may include one or more of a central processing unit (CPU), a micro-processing unit (MPU), or another circuit, and may include a network of separate computers or separate computer processors. The computer-executable instructions may be provided to a computer from, for example, a network or storage medium. The storage medium may include one or more of, for example, a hard disk, a random-access memory (RAM), a read-only memory (ROM), a storage of a distributed computing system, an optical disk (compact disc (CD), a digital versatile disk (DVD), or a blue-ray disk (BD)), a flash memory device, a memory card, and the like.

Alternatively, the cooling unit 110, the humid air supply unit 120, and the cooling base 750 may be configured as a humid air forming device 800 configured to form moisture particles on the surface of the measurement object 200. Meanwhile, at least one of the transfer unit 140, the controller 760, and the temperature/humidity sensing unit 790 may be included in the humid air forming device 800.

Alternatively, the measurement system 700 may further include a measurement object sensing unit configured to sense the position of the measurement object 200 transferred by the transfer unit 140 and to output position information including the sensed position. The measurement object sensing unit may include a position sensor or the like, but is not limited thereto.

Alternatively, the measurement system 700 may further include a humid air exhaust port configured to exhaust the humid air sprayed from the humid air supply unit 120. When the measurement system 700 includes a humid air exhaust port as described above, it is possible to reduce the possibility of trouble or the like in the measurement system 700 due to the humid air sprayed from the humid air supply unit 120.

Alternatively, the measurement system 700 may further include a suction unit that is connected to the suction pipe 755 of the cooling base 750 and operates to suck air such that the measurement object 200 is sucked and held by the upper plate 752 of the cooling base 750.

Further, when the image data of the measurement object 200 is acquired after the spraying of the humid air, too much fogging may occur on the surface of the measurement object 200 (that is, condensation of moisture particles is excessive), or too little fogging may occur (that is, condensation of moisture particles is insufficient), so accurate two-dimensional or three-dimensional shapes may not be derived when getting the acquired image data. Alternatively, the controller 760 may adjust the degree to which the humid air is mixed with the external air by adjusting the air volume of hot air sprayed from the hot air forming unit 121 before the setting of the measurement system 700, and may set the optimum air volume. That is, the controller 760 may form a control signal for controlling the intensity of hot air based on the temperature/humidity sensing information sensed through the temperature/humidity sensing unit. Accordingly, the hot air forming unit 121 may adjust the air volume of hot air in accordance with the control signal from the controller 760.

Figure 10:
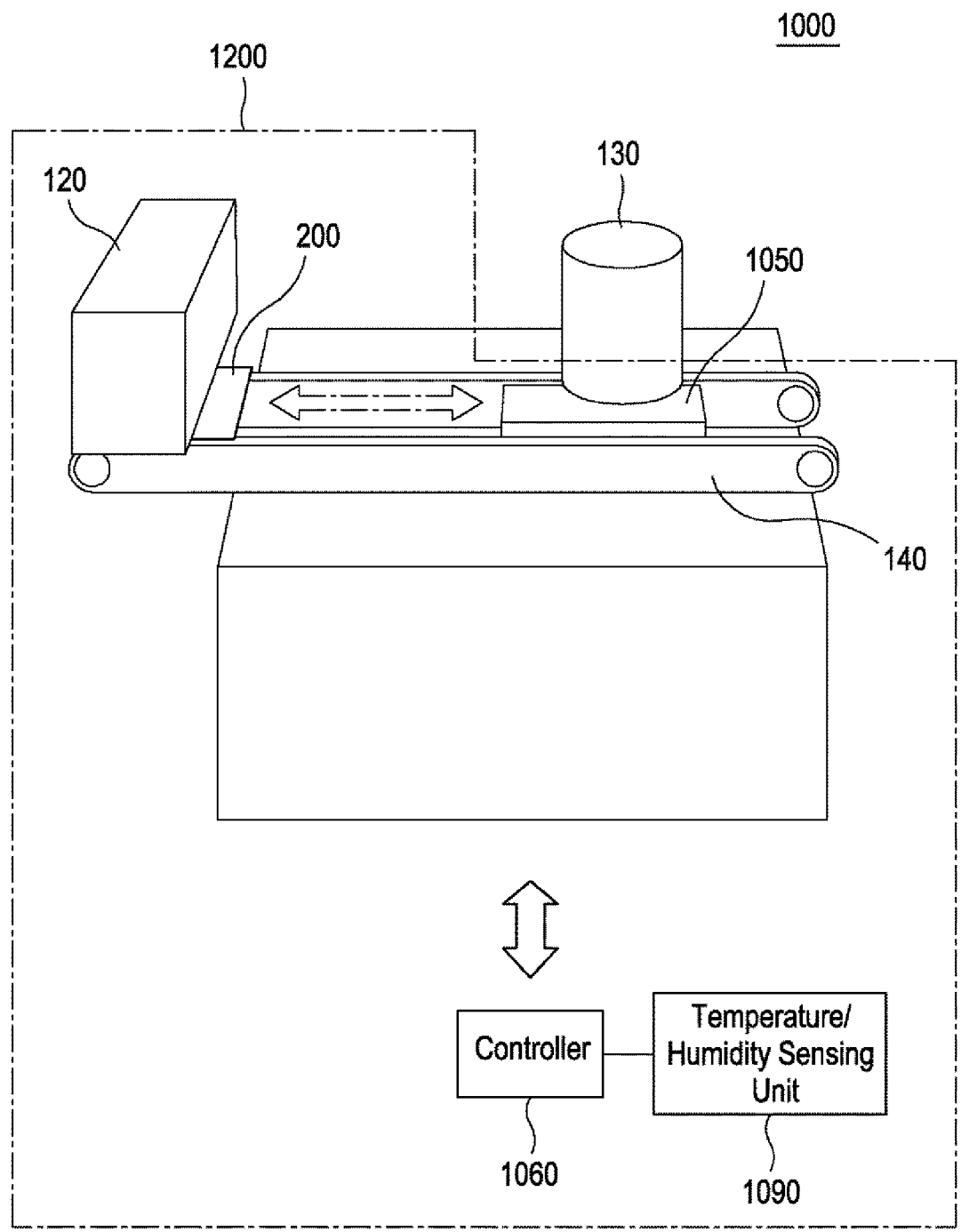
FIG. 10 is a perspective view schematically illustrating a measurement system according to still another embodiment of the present disclosure.

FIG. 10 is a perspective view schematically illustrating a measurement system according to an embodiment of the present disclosure. In the present embodiment, elements similar to those described above are denoted by similar reference numerals, and a detailed description thereof will be omitted.

Referring to FIG. 10, a measurement system 1000 according to the present embodiment may include a cooling base 1050. The cooling base 1050 may cool and maintain the measurement object 200 to a temperature that is equal to or lower than the third temperature. That is, the cooling base 1050 may perform the functions of the cooling unit 110 of FIG. 1 and the cooling base 750 of FIG. 7, and may cool the measurement object 200 to a temperature that is equal to or lower than the third temperature and may maintain the cooled measurement object 200 at a temperature that is equal to or lower than the third temperature. That is, the moisture particles may be formed and maintained on the surface of the measurement object 200 by changing the air around the surface of the measurement object 200 into the vapor-saturated state or the vapor-supersaturated state according to the psychrometric chart. The cooling base 1050 in the present embodiment has a configuration that is the same as that of the cooling base 750 illustrated in FIG. 8, and therefore, a detailed description thereof will be omitted from the present embodiment.

As described above, in the present embodiment, it is possible to simplify the measurement system 1000 and to reduce the cost of manufacturing the measuring system 1000 by cooling and maintaining the measurement object 200 using a cooling base 1050 instead of the cooling unit 110 illustrated in FIG. 1.

The measurement system 1000 may further include a temperature/humidity sensing unit 1090. The temperature/humidity sensing unit 1090 may sense the temperature and humidity around the measurement system 1000, and may sense the temperature of the cooling base 1050. The cooling base 1090 in the present embodiment has a configuration and function that are the same as those of the temperature/humidity sensing unit 790 illustrated in FIG. 7, and therefore, a detailed description thereof will be omitted in the present embodiment.

The measurement system 1000 may further include a controller 1060. The controller 1060 in the present embodiment is similar to the controller 760 in FIG. 7 configured to control the temperatures of the cooling unit 110 and the cooling base 750, except that the controller 1060 adjusts only the temperature of the cooling unit 1050, and therefore, a detailed description thereof will be omitted in the present embodiment.

Alternatively, the cooling base 1050 and the humid air supply unit 120 may be configured as a humid air forming device 1200 configured to form moisture particles on the surface of the measurement object 200. Meanwhile, at least one of the transfer unit 140, the controller 1060, and the temperature/humidity sensing unit 1090 may be included in the humid air forming device 1200.

Alternatively, the measurement system 1000 may further include a measurement object sensing unit configured to sense the position of the measurement object 200 transferred by the transfer unit 140 and to output position information including the sensed position. The measurement object sensing unit may include a position sensor or the like, but is not limited thereto.

Alternatively, the measurement system 1000 may further include a humid air exhaust port configured to exhaust the humid air sprayed from the humid air supply unit 120. When the measurement system 1000 includes a humid air exhaust port as described above, it is possible to reduce the possibility of trouble or the like in the measurement system 1000 due to the humid air sprayed from the humid air supply unit 120.

Alternatively, the measurement system 1000 may further include a suction unit that is connected to the suction pipe of the cooling base 1050 and operates to suck air such that the measurement object 200 is sucked and held by the upper plate of the cooling base 1050.

Further, when the image data of the measurement object 200 is acquired after the spraying of the humid air, too much fogging may occur on the surface of the measurement object 200 (that is, condensation of moisture particles is excessive), or too little fogging may occur (that is, condensation of moisture particles is insufficient), so accurate two-dimensional or three-dimensional shapes may not be derived only with the acquired image data. Alternatively, the controller 1060 may adjust the degree to which the humid air is mixed with the external air by adjusting the air volume of hot air sprayed from the hot air forming unit 121 before the setting of the measurement system 1000, and may set the optimum air volume. That is, the controller 1060 may form a control signal for controlling the air volume of hot air based on the temperature/humidity sensing information sensed through the temperature/humidity sensing unit. Accordingly, the hot air forming unit 121 may adjust the air volume of hot air in accordance with the control signal from the controller 1060.

Figure 11:
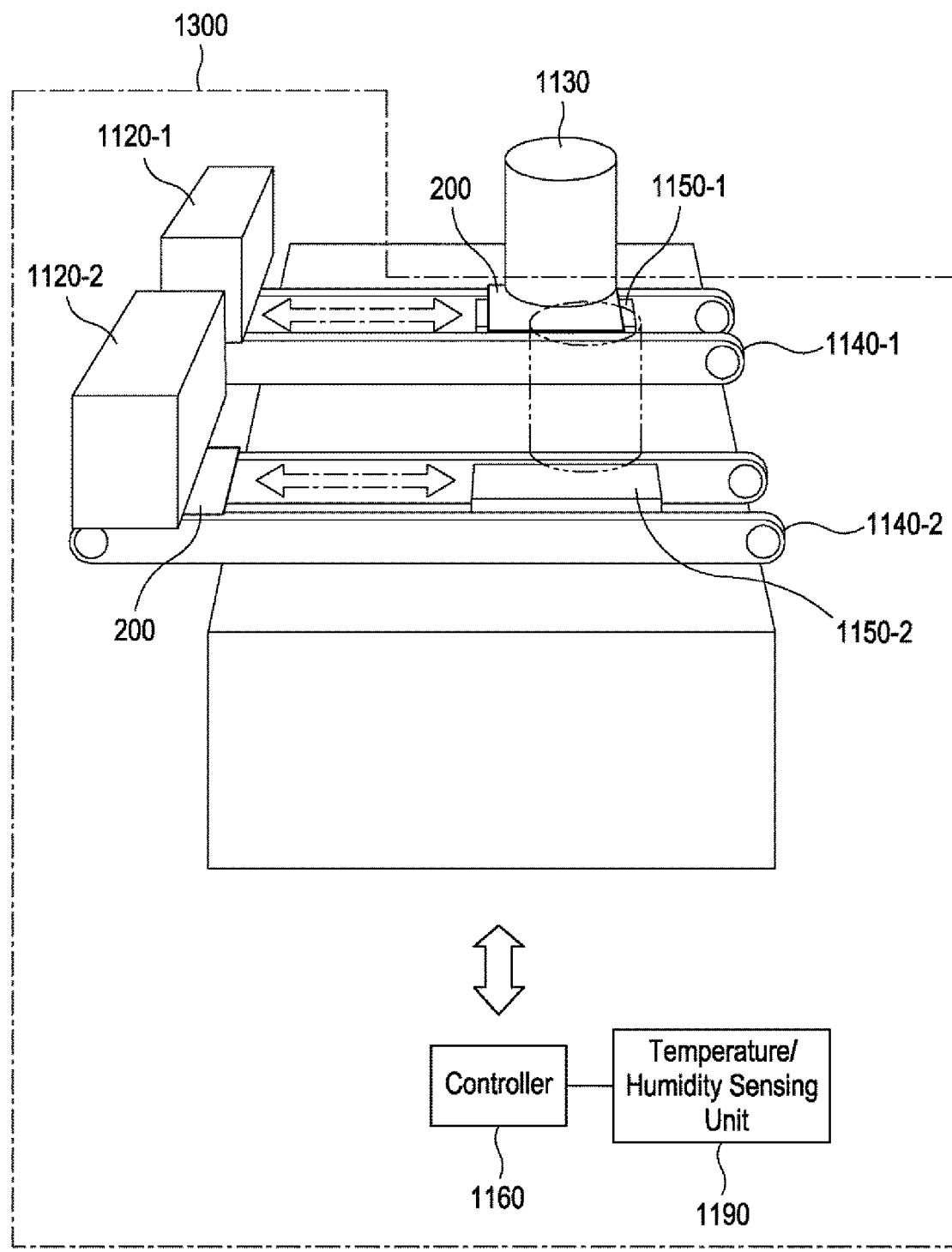
FIG. 11 is a perspective view schematically illustrating a measurement system according to still another embodiment of the present disclosure.

FIG. 11 is a perspective view schematically illustrating a measurement system 1100 according to an embodiment of the present disclosure. Referring to FIG. 11, the measurement system 1100 may include cooling bases 1150-1 and 1150-2. The cooling bases 1150-1 and 1150-2 in the present embodiment have a configuration and function that are the same as those of the cooling base 750 illustrated in FIG. 7, and therefore, a detailed description thereof will be omitted in the present embodiment. In addition, in the present embodiment, the measurement system 1100 is described as including two cooling bases 1150-1 and 1150-2. However, without necessarily being limited thereto, the measurement system 1100 may include three or more cooling bases. As described above, in the present embodiment, it is also possible to simplify the measurement system 1000 and to reduce the manufacturing costs of the measurement system 1000 by cooling the measurement object 200 using the cooling bases 1150-1 and 1150-2 instead of the cooling unit 110 of FIG. 1.

The measurement system 1100 further includes humid air supply units 1120-1 and 1120-2. The humid air supply units 1120-1 and 1120-2 in the present embodiment have a configuration and function that are the same as those of the humid air supply unit 120 of FIG. 1, and therefore, a detailed description thereof will be omitted in the present embodiment. In addition, in the present embodiment, the measurement system 1100 is described as including two humid air supply units 1120-1 and 1120-2. However, without necessarily being limited thereto, the measurement system 1100 may include three or more humid air supply units.

The measurement system 1100 further includes an image data acquisition unit 1130. In the present embodiment, the image data acquisition unit 1130 may further include a moving apparatus configured to move in a predetermined direction. Accordingly, the image data acquisition unit 1130 may be moved to the side of the cooling base 1150-1 and the cooling base 1150-2 by the moving apparatus and may acquire the image data of measurement objects 200, which are loaded on the cooling base 1150-1 and the cooling base 1150-2, respectively. In the present embodiment, the measurement system 1100 is described as including one image data acquisition unit 1130. However, without necessarily being limited thereto, the measurement system 1100 may include two or more image data acquisition units.

The measurement system 1100 may further include transfer units 1140-1 and 1140-2. The transfer units 1140-1 and 1140-2 in the present embodiment have a configuration and function that are the same as those of the transfer unit 140 of FIG. 10, and therefore, a detailed description thereof will be omitted in the present embodiment. In addition, in the present embodiment, the measurement system 1100 is described as including two transfer units 1140-1 and 1140-2. However, without necessarily being limited thereto, the measurement system 1100 may include three or more transfer units.

The measurement system 1100 may further include a temperature/humidity sensing unit 1190. The temperature/humidity sensing unit 1190 is similar to the temperature/humidity sensing unit 1090 of FIG. 10, except that the temperature/humidity sensing unit 1190 in the present embodiment is installed in each of the cooling bases 1150-1 and 1150-2 in order to detect the temperatures of the cooling bands 1150-1 and 1150-2, respectively, and thus, a detailed description thereof will be omitted in the present embodiment.

The measurement system 1100 further includes a controller 1160. The controller 1160 in the present embodiment is similar to the controller 1060 of FIG. 10, except that the controller 1160 in the present embodiment adjusts the temperature of each of the cooling bases 1150-1 and 1150-2 and the humid air supply units 1120-1 and 1120-2, and thus, a detailed description thereof will be omitted in the present embodiment.

Alternatively, the cooling bases 1150-1 and 1150-2 and the humid air supply units 1120-1 and 1120-2 may be configured as a humid air forming device 1300 configured to form moisture particles on the surfaces of the measurement objects 200. Meanwhile, at least one of the transfer units 1140-1 and 1140-2, the controller 1160, and the temperature/humidity sensing unit 1190 may be included in the humid air forming device 1300.

Alternatively, the measurement system 1100 may further include a measurement object sensing unit configured to sense the position of the measurement object 200 transferred by each of the transfer units 1140-1 and 1140-2 and to output position information including the sensed positions. The measurement object sensing unit may include a position sensor or the like, but is not limited thereto.

Alternatively, the measurement system 1100 may further include a humid air exhaust port configured to exhaust the humid air sprayed from each of the humid air supply units 1120-1 and 1120-2. When the measurement system 1100 includes a humid air exhaust port as described above, it is possible to reduce the possibility of occurrence of trouble or the like in the measurement system 1100 due to the humid air sprayed from each of the humid air supply units 1120-1 and 1120-2.

Alternatively, the measurement system 1100 may further include a suction unit that is connected to the suction pipe of each of the cooling base 1150-1 and 1150-2 and operates to suck air such that the measurement objects 200 are sucked and held by the upper plates of the cooling bases 1150-1 and 1150-2, respectively.

Further, when the image data of the measurement objects 200 is acquired after the spraying of the humid air, there may occur a case in which too much fogging may occur on the surfaces of the measurement objects 200 (that is, condensation of moisture particles is excessive), or too little fogging may occur (that is, condensation of moisture particles is insufficient), and thus an accurate two-dimensional or three-dimensional shape may not be derived when getting the acquired image data. Alternatively, the controller 1160 may adjust the degree to which the humid air is mixed with the external air by adjusting the air volume of hot air sprayed from the hot air forming unit of each of the humid air supply units 1120-1 and 1120-2 before the setting of the measurement system 1100, and may set the optimum air volume. That is, the controller 1160 forms a control signal for controlling the intensity of hot air based on the temperature/humidity sensing information sensed through the temperature/humidity sensing unit. Accordingly, the hot air forming unit of each of the humid air supply units 1120-1 and 1120-2 may adjust the air volume of hot air in accordance with the control signal from the controller 1160.

In addition, it is important to keep the temperature, humidity, etc. of the humid air constant in order to perform an accurate measurement using the humid air forming device. Therefore, in order to keep the temperature, humidity, etc. of the humid air constant, it is common to continuously drive the humid air forming device. However, the life spans of the heater and the humidifier included in the humid air forming device are shortened in proportion to the use time. Therefore, it may be desirable to improve the life spans of the humid air forming device, rather than to continuously drive the humid air forming device.

In addition, there may be a case in which the measurement (or inspection) process may not be performed for a predetermined time due to a failure occurring in the process before the measurement (or inspection). Continuously driving the humid air forming device even in such a case may be uneconomical. However, by using the method of stopping the driving of the humid air forming device when the measurement (or inspection) is stopped and restarting the driving, the measurement (or inspection) may not be started until the humid air reaches the desired temperature and humidity, and thus, the measurement (or inspection) may be delayed.

According to the present embodiment, it is possible to solve the problems mentioned above.

Figure 12:
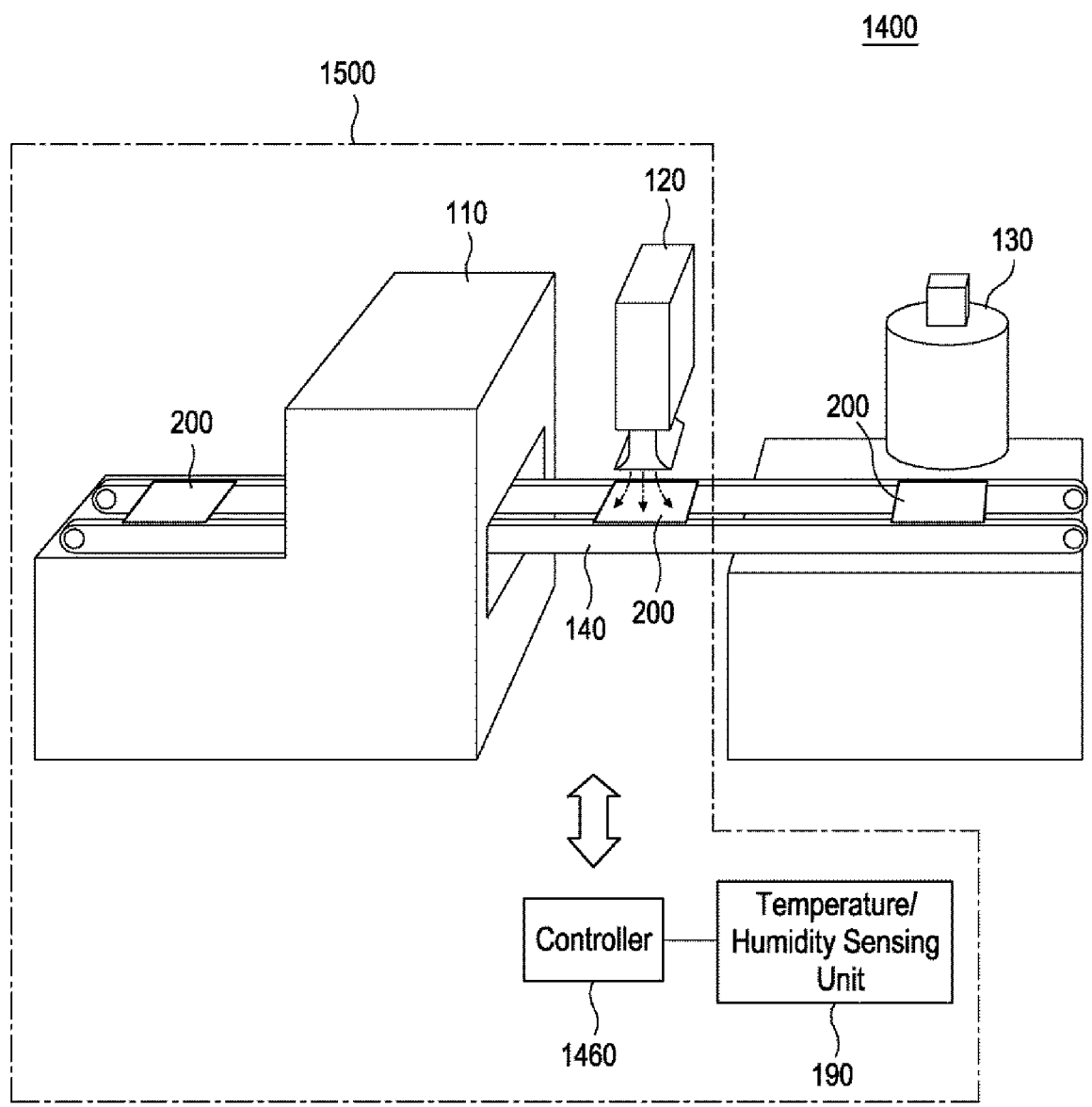
FIG. 12 is a perspective view schematically illustrating a measurement system according to still another embodiment of the present disclosure.

FIG. 12 also illustrates a measurement system 1400 according to the present embodiment. The measurement system 1400 according to the present embodiment includes at least one of a cooling unit 110, a humid air supply unit 120, an image data acquisition unit 130, a transfer unit 140, a controller 1460, and a temperature/humidity sensing unit 190. The cooling unit 110, the image data acquisition unit 130, the transfer unit 140, and the temperature/humidity sensing unit 190 in the present embodiment have functions that are similar to those of the cooling unit 110, the image data acquisition unit 130, the transfer unit 140, and the temperature/humidity sensing unit 190 of FIG. 1, and thus a detailed description thereof will be omitted in the present embodiment.

Figure 13:
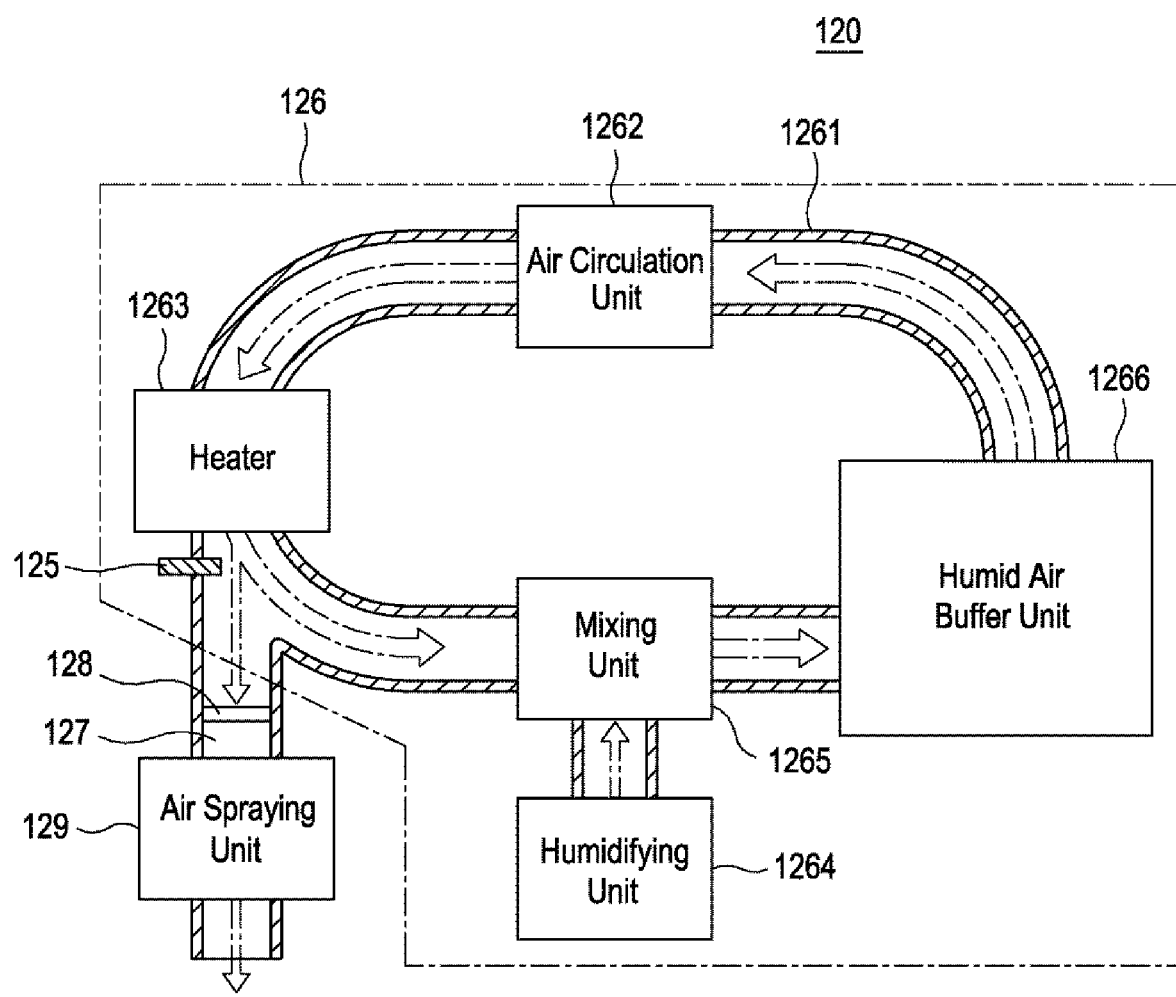
FIG. 13 is a configuration view schematically illustrating the configuration of a humid air supplying unit according to yet another embodiment of the present disclosure.

FIG. 13 is a configuration view schematically illustrating the configuration of a humid air supply unit 120 according to an embodiment of the present disclosure. In the humid air supply unit 120 according to the present embodiment, the humid air circulation unit 126 forms, heats, and circulates humid air. In the present embodiment, the humid air circulation unit 126 includes a wind path 1261, an air circulation unit 1262, a heater 1263, and a humidifying unit 1264. The humid air circulation unit 126 further includes a mixing unit 1265 and a humid air buffer unit 1266.

The wind path 1261 is a pipe in which humid air is circulated in a closed manner, and heating and humidification may be performed during the circulation. In the present embodiment, the wind path may be implemented as a closed passage that connects a heater 1263 configured to heat the humid air circulating in the wind path, a mixing unit 1265 configured to apply moisture generated by the humidifying unit 1264 to the humid air, and the air circulation unit 1262 configured to circulate humid air. In the present embodiment, the wind path 1261 is described as a closed passage in which the heater 1263, the mixing unit 1265, and the like are connected. However, in another embodiment, components such as the heater 1263 and the mixing unit 1265 and the like may be located within the wind path 1261.

The wind path 1261 may have a circular or polygonal tube shape in cross section. However, without necessarily being limited thereto, the size of the wind path 1261 may be variously changed as needed. In addition, the wind path 1261 is provided with a suction port in order to suck external air from the outside, so that external air may be sucked. However, the suction port is not necessarily limited thereto, and may be installed in at least one of the heater 1263, the humidifying unit 1264, the air circulation unit 1262, and the humid air buffer unit 1266. In some embodiments, it is also possible to operate an air spraying unit 129 in the reverse direction such that external air may be quickly sucked through a humid air guide pipe 127.

The air circulation unit 1262 may circulate the humid air through the wind path 1261 in a closed manner. As an example, the air circulation unit 1262 may continuously circulate the humid air through the wind path 1261 in a closed manner. When the humid air is not circulated in a closed manner, the humid air may be cooled according to the position such that the temperature, humidity and the like may be changed. In this embodiment, it is possible to maintain a large amount of the humid air in the state in which the temperature and the humidity are uniform by circulating the humid air through the air circulation unit 1262. Accordingly, it is possible to prevent the humid air from being condensed in a part of the wind path 1261.

The heater 1263 may heat the humid air, which circulates through the wind path 1261, to be equal to or higher than a preset temperature (hereinafter, referred to as a "fourth temperature"). According to the psychrometric chart, the amount of saturated vapor is proportional to the temperature. Therefore, when the humid air is heated as in the present embodiment, the absolute amount of vapor contained by the humid air may be increased. When the absolute amount of water vapor increases, the amount of moisture to be condensed on the surface of the measurement object 200 may be increased. In addition, when the amount of saturated vapor is increased by heating the humid air, the condensation of the humid air within the wind path 1261 may be minimized. Considering the installation environment or the like of a conventional measurement system, the fourth temperature may be in the range of 20° C. to 300° C., in the range of 30° C. to 200° C., or in the range of 40° C. to 150° C. The heater 1263 may be any device as long as it can heat the humid air.

In the above-described embodiment, the heater 1263 is described as heating the humid air, but the present disclosure is not limited thereto. For example, when the humidifying unit 1264 applies sufficient vapor to the humid air or when the temperature of the measurement object 200 cooled to a temperature, which is equal to or lower than the first temperature, by the cooling unit 110 is sufficiently low, the air around the surface of the measurement object 200 may go to a vapor-saturated state or a vapor-supersaturated state according to the psychrometric chart, even if the humid air is not heated. Accordingly, dew condensation may occur on the surface of the measurement object 200 so that moisture particles may be generated.

The humidifying unit 1264 forms moisture (or fine water droplets). The humidifying unit 1264 may be an ultrasonic humidifier. However, without being limited thereto, any apparatus may be used as long as it can form moisture.

In the present embodiment, when the temperature, humidity and the like of the humid air reach desired values, the driving of the heater 1263 and the humidifying unit 1264 may be temporarily stopped by the controller 1460 of the measurement system 1400. The controller 1460 will be described in detail below. Even if the controller 1460 temporarily stops the heater 1263 and the humidifying unit 1264, the humid air is circulated in a closed manner in the wind path 1261 by the air circulation unit 1262, so that the temperature and humidity of the humid air may be maintained in a uniform state within the wind path 1261. In this way, the controller 1460 may temporarily stop driving of the heater 1263 and the humidifying unit 1264, and may restart the driving of the humid air circulation unit 126 when the temperature and humidity of the humid air deviate from a predetermined standard. In this way, in the present embodiment, the temperature, the humidity and the like of the humid air may be maintained constant by controlling the driving of the humid air circulation unit 126 to be turned on/off from time to time. Accordingly, the driving time of the heater 1263 and the humidifying unit 1264 may be reduced, and the durability thereof may be improved. In another embodiment, the heater 1263 and the humidifying unit 1264 may be controlled by being periodically turned on/off.

As described above, it is possible to minimize the driving of the heater 1263 and the humidifying unit 1264 while maintaining the temperature, humidity and the like of the humid air constant and the condensation of the humid air may also be prevented by circulating the humid air through the wind path 1261.

In the embodiment described above, the heater 1263 and the circulation air spraying unit 1262 are described as being separately configured, but the present disclosure is not limited thereto. For example, the heater 1263 and the circulation air spraying unit 1262 may be configured as an integrally formed hot air blower.

Figure 14:
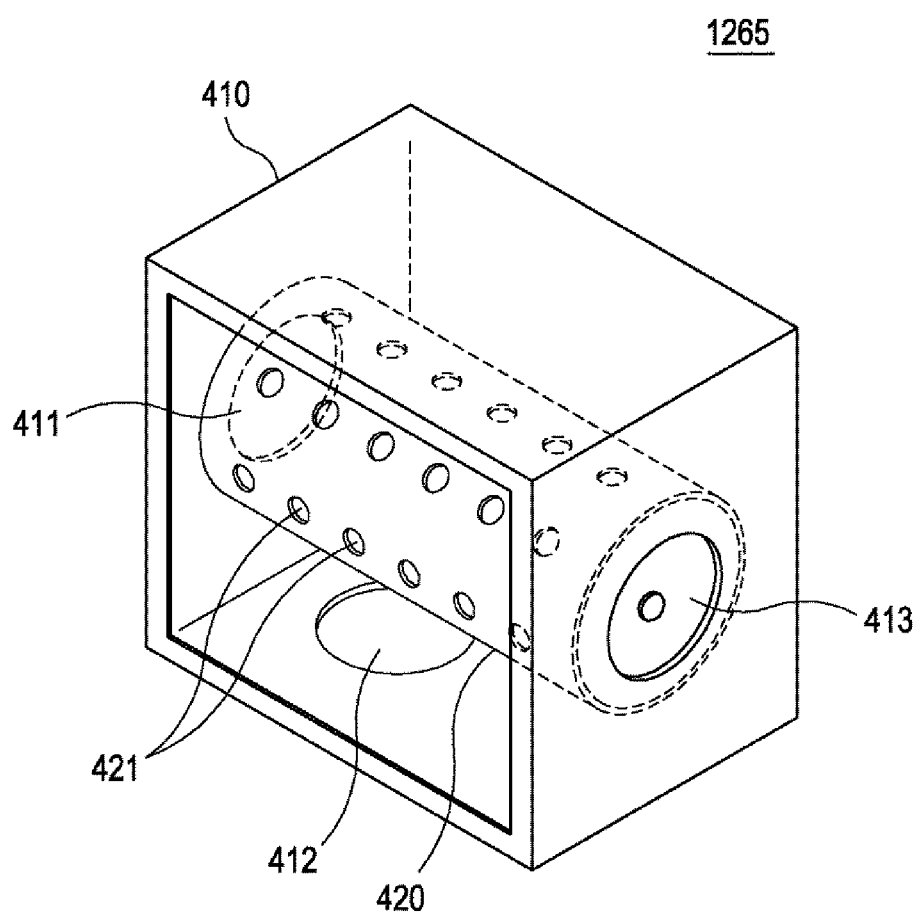
FIG. 14 is a perspective view of a mixing unit according to yet another embodiment of the present disclosure.
Figure 15:
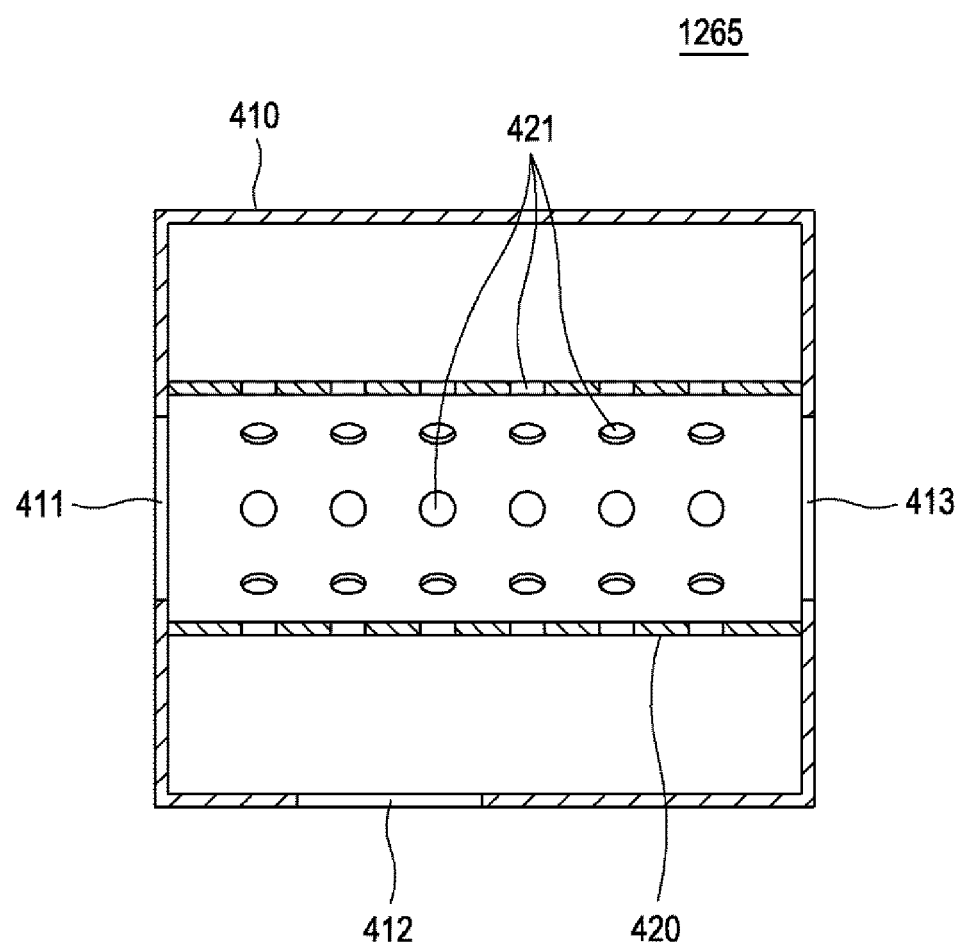
FIG. 15 is a cross-sectional view of a mixing unit according to yet another embodiment of the present disclosure.

The mixing unit 1265 may form humid air having a higher humidity than the humid air heated by the heater 1263 by mixing humid air heated by the heater 1263 and moisture formed by the humidifying unit 1264. FIG. 14 is a perspective view of the mixing unit 1265 according to the present embodiment of the present disclosure, and FIG. 15 is a cross-sectional view of the mixing unit 1265 according to the embodiment of the present disclosure. Referring to FIGS. 14 and 15, the mixing unit 1265 may include a case 410.

The case 410 may seal humid air heated by the heater 1263 and the moisture formed in the humidifying unit 1264. For example, the case 410 may include a first inlet 411 configured to be connected to the wind path 1261 and allowing the flow of humid air heated by the heater 1263, a second inlet 412 configured to be connected to the humidifying unit 1264 allowing the flow of moisture from the humidifying unit 1264 and a discharge port 413 configured to be connected to the wind path 1261 and allowing the discharge of humid air (i.e., humid air to which humid air heated by the heater 1263 and moisture from the humidifier 1264 are mixed) to the wind path 1261.

The mixing unit 1265 may further include a mixing pipe 420. The mixing pipe 420 may be connected to the first inlet 411 and the discharge port 413 of the case 410. In addition, the mixing pipe 420 may have a plurality of through holes 421. The diameter of the through holes 421 may be in the range of 1 mm to 10 mm, but is not limited thereto.

In the present embodiment, the humid air heated by the heater 1263 is introduced into the mixing pipe 420 through the first inlet 411 in the case 410, and the moisture formed by the humidifying unit 1264 may be introduced into the mixing pipe 420 through the second inlet 412 in the case 410 and via the through holes 421. Accordingly, humid air heated by the heater 1263 and humid air formed by the humidifying unit 1264 may be mixed within the mixing pipe 420, thereby forming humid air having a higher humidity than that of the humid air heated by the heater 1263.

In the above-described embodiment, the humid air circulation unit 126 is described as including the mixing unit 1265, but the present disclosure is not limited thereto. For example, the humid air circulation unit 126 may not include the mixing unit 1265, and the humid air heated by the heater 1263 and the humid air formed by the humidifying unit 1264 may be mixed in the wind path 1261.

Referring to FIG. 13 again, the humid air buffer unit 1266 may be installed between the mixing unit 1265 and the air circulation unit 1262, and may store the humid air formed by the mixing unit 1265. The shape and size of the humid air buffer unit 1266 may be variously changed as needed. In this way, when the humid air circulation unit 126 includes the humid air buffer unit 1266, the humid air within the wind path 1261 does not abruptly run out of humid air even if the humid air is sprayed by the air spraying unit 129. This makes it possible to prevent the temperature and the humidity of the humid air from abruptly dropping, and to prevent off-time of the heater 1263 and the humidifying unit 1264 (i.e., the time period between the driving time and the driving-stop time of the heater 1263 and the humidifying unit 1264) from being shortened.

In the above-described embodiment, the humid air circulation unit 126 is described as including the humid air buffer unit 1266. However, without necessarily being limited thereto, the humid air circulation unit 126 may not include the humid air buffer unit 1266 if the wind path 1261 is capable of maintaining a sufficient amount of humid air.

The humid air supply unit 120 may include an opening/closing unit 128, a humid air guide pipe 127, and an air spraying unit 129, in which the opening/closing unit 128, the humid air guide pipe 127, and the air spraying unit 129 are configured to guide a part of humid air, which is heated, humidified, and circulated in a closed manner by the humid air circulation unit 126, and to spray the part of the humid air onto the measurement object 200.

When the air spraying unit 129 operates while the opening/closing unit 128 is opened, a part of the humid air, which is circulating in the wind path 1261, may be guided to the humid air guide pipe 127 and sprayed onto the measurement object 200. The opening/closing unit 128 may be installed between a coupling part of the wind path 1261 and the humid air guide pipe 127 and the upper end of the air spraying unit 129. However, without necessarily being limited thereto, the opening/closing unit 128 may be installed at the lower end of the air spraying unit 129.

In the present embodiment, the opening/closing unit 128 may close the humid air guide pipe 127 until the temperature and the humidity of the humid air circulating through the wind path 1261 reach predetermined conditions, thereby blocking the supply of the humid air to the measurement object 200. When the measurement object 200 is transferred in a state in which the temperature and the humidity of the humid air circulating in the wind path 1261 reach predetermined conditions, the humid air supply unit 120 may open the opening/closing unit 128, and may supply a part of the humid air circulating in the wind path 126 in a closed manner to the air spraying unit 129.

The air spraying unit 129 may spray the humid air onto the surface of the measurement object 200. For example, when the measurement object 200 is transferred in a state in which the temperature and humidity of the humid air circulating through the wind path 1261 reach predetermined conditions, the air spraying unit 129 may spray the humid air, which is supplied from the wind path 1261 opened by the opening/closing unit 128, onto the surface of the measurement object 200. The air spraying unit 129 includes a fan, but is not limited thereto. The humid air may be sprayed onto the surface of the measurement object 200 within a very short time by spraying the humid air onto the surface of the measurement object 200 through the air spraying unit 129.

In the above-described embodiment, the humid air is described as being sprayed onto the surface of the measurement object 200 through the air spraying unit 129, but the present disclosure is not limited thereto. For example, the humid air supply unit 120 may not include the air spraying unit 129, and may spray the humid air onto the surface of the measurement object 200 through the air circulating unit 1262.

The humid air sensing unit 125 may be installed at a predetermined position within the wind path 1261 and sense the temperature and humidity of the humid air circulated through the wind path 1261, and may form sensing information (hereinafter, referred to "humid air sensing information") including the sensed temperature and humidity. For example, the humid air sensing unit 125 may include a temperature/humidity sensor, but is not limited thereto.

The measurement system 1400 may further include a controller 1460. The controller 1460 may control the operation of each of the components of the measurement system 1400, that is, the cooling unit 110, the humid air supply unit 120, the image data acquisition unit 130, the transfer unit 140, and the temperature/humidity sensing unit 190.

As an example, the controller 1460 may set the first temperature of the cooling unit 110 based on the temperature and the humidity of the humid air in the humid air supply unit 120. For example, when the temperature of the humid air is 20° C. and the humidity of the humid air is 50%, the controller 1460 may apply the temperature and humidity to the psychrometric chart, and may calculate the dew point temperature 9° C. at which dew condensation may occur. Accordingly, the controller 1460 may set the first temperature to be equal to or lower than 9° C. The controller 1460 may form and output a control signal for adjusting a temperature, to which the cooling unit 110 cools the measurement object 200, to be equal to or lower than the first temperature, so that the cooling unit 110 may cool the measurement object 200 to be equal to or lower than the first temperature.

In addition, the controller 1460 may adjust the first temperature of the cooling unit 110 based on the temperature/humidity sensing information of the ambient air, which is provided from the temperature/humidity sensing unit 190. For example, when it is determined that the moisture particles formed on the surface of the measurement object 200 are difficult to maintain until the image data is acquired according to the temperature/humidity sensing information of the ambient air, the controller 1460 sets the first temperature to a lower value. For example, when the cooling of the measurement object 200 is not sufficiently maintained until the image data of the measurement object 200 is acquired and thus, the air around the surface of the measurement object 200 goes to a vapor-unsaturated state according to the psychrometric chart, moisture particles formed on the surface of the measurement object 200 may evaporate. Therefore, when the controller 1460 sets the first temperature to be sufficiently low such that the air around the surface of the measurement object 200 maintain a vapor-saturated state or vapor-supersaturated state until the image data of the measurement object 200 is acquired, the moisture particles may be maintained on the surface of the measurement object long enough.

In addition, the controller 1460 may control the formation and spraying of the humid air of the humid air supply unit 120 based on the humid air sensing information provided from the humid air sensing unit 125. For example, the controller 1460 compares the humid air sensing information (i.e., the temperature of the humid air) provided from the humid air sensing unit 125 with a preset fourth temperature, and determines whether the temperature of the humid air is equal to or higher than the fourth temperature. When the temperature of the humid air is equal to or lower than the fourth temperature, the controller 1460 may further operate the heater 1263.

In addition, the controller 1460 may determine the humidity of the humid air based on the first temperature and the fourth temperature. For example, the controller 1460 may calculate the humidity of the humid air at which dew condensation may occur, that is, the humidity (hereinafter, referred to as "dew condensation occurrence humidity") at which moisture particles may be generated on the surface of the measurement object 200 by applying the first temperature and the fourth temperature to the psychrometric chart. For example, when the first temperature is 9° C. and the fourth temperature is 20° C., the dew condensation occurrence humidity is 50%. The controller 1460 compares the humidity sensing information (i.e., the humidity of the humid air) provided from the humid air sensing unit 125 with the dew condensation occurrence humidity, and determines whether the humidity of the humid air is equal to or higher than the dew condensation occurrence humidity. When the humidity of the humid air is equal to or lower than the dew condensation occurrence humidity, the controller 1460 may further operate the humidifying unit 1264.

When the measurement object 200 is transferred in a state in which the temperature of the humid air is equal to or higher than the fourth temperature and the humidity of the humidifier is equal to or higher than the dew condensation occurrence humidity, the controller 1460 may spray the humid air onto the measurement object 200. For example, the controller 1460 may output control signals for opening the opening/closing unit 128, driving the air spraying unit 129, and stopping the driving of the heater 1263 and the humidifying unit 1264 (heating humid air and forming moisture). Accordingly, the opening/closing unit 128 may open the humid air guide pipe 127, and the air spraying unit 129 may spray the humid air onto the surface of the measurement object 200. In addition, the heater 1263 may stop the heating of the humid air circulating through the wind path 1261, and the humidifying unit 1264 may stop the formation of moisture. It is possible to increase the lifespans of the heater 1263 and the humidifying unit 1264 by stopping the driving of the heater 1263 and the humidifying unit 1264 in accordance with the sensed temperature and humidity of the humid air.

Meanwhile, when it is determined that the temperature of the humid air is lower than the fourth temperature or the humidity of the humid air is lower than the dew condensation occurrence humidity, the controller 1460 may close the opening/closing unit 128 and stop the driving of the air spraying unit 129 (the spraying of the humid air).

As another embodiment, the controller 1460 may control the on/off of the heater 1263 and the humidifying unit 1264 based on the number of times of opening/closing of the opening/closing unit 128 and the number of times of driving of the air spraying unit 129. When performing the measurement (non-defective/defective inspection) for the measurement object 200 in-line, the humid air may be repeatedly sprayed for a predetermined period of time. At this time, when the humid air is sprayed onto the measurement object 200 a predetermined number of times (e.g., three times), the temperature and the humidity of the humid air within the wind path 1261 may be lowered so that it may be necessary to heat the humid air within the wind path 1261 and to supply moisture to the humid air. Accordingly, when the number of times of opening/closing of the opening/closing unit 128 and the number of times of driving of the air spraying unit 129 are, for example, three times, that is, when the humid air is sprayed onto the measurement object 200 three times, the controller 1460 may repeat the process of driving the heater 1263 and the humidifying unit 1264 for a predetermined period of time and then stop the driving. In this manner, the controller 1460 may control the on/off of the heater 1263 and the humidifying unit 1264 without real time temperature/humidity information by turning on/off the heater 1263 and the humidifying unit 1264 based on the number of times of opening/closing of the opening/closing unit 128 and the number of times of driving of the air spraying unit 129.

As another embodiment, the controller 1460 may control the on/off of the heater 1263 and the humidifying unit 1264 based on whether the opening/closing unit 128 is opened or closed and whether the air spraying unit 129 is driven or not. For example, when the opening/closing unit 128 is opened and the air spraying unit 129 is driven, that is, when humid air is sprayed onto the measurement object 200, the controller 1460 may operate the heater 1263 and the humidifying unit 1264 to heat the humid air within the wind path 1261 and supply moisture, and when the opening/closing unit 128 is closed and the air spraying unit 129 is not driven, the controller 1460 may not operate the heater 1263 and the humidifying unit 1264.

As another example, when the measurement (or inspection) is temporarily stopped in the process, the controller 1460 may temporarily stop the driving of the heater 1263 and the humidifying unit 1264 without generating or discharging humid air. By increasing the off time of the heater 1263 and the humidifying unit 1264 during the stoppage of the measurement (or inspection), it is possible to minimize the driving time of the heater 1263 or the humidifying unit 1264, thereby improving the durability.

As still another example, the controller 1460 may set a time interval for turning on/off each of the heater 1263 and the humidifying unit 1264 in advance, and may periodically turn on/off each of the heater 1263 and the humidifying unit 1264 at predetermined time intervals.

As an example, the controller 1460 may be implemented by a computer system or apparatus, which reads and executes computer-executable instructions recorded on a storage medium (e.g., a non-transitory computer-readable storage medium) in order to perform one or more of the functions described above, and may also be implemented by a method performed by the computer system or apparatus by reading and executing the computer-executable commands from the storage medium in order to perform one or more functions in the embodiment(s) described above. The computer may include one or more of a central processing unit (CPU), a micro-processing unit (MPU), or another circuit, and may include a network of separate computers or separate computer processors. The computer-executable instructions may be provided to a computer from, for example, a network or storage medium. The storage medium may include one or more of, for example, a hard disk, a random-access memory (RAM), a read-only memory (ROM), a storage of a distributed computing system, an optical disk (a compact disc (CD), a digital versatile disk (DVD), or a blue-ray disk (BD)), a flash memory device, a memory card, and the like.

Alternatively, the cooling unit 110 and the humid air supply unit 120 may be configured as a humid air forming device 1500 configured to form moisture particles on the surface of the measurement object 200. Meanwhile, at least one of the controller 1460 and the temperature/humidity sensing unit 190 may be included in the humid air forming device 1500.

Alternatively, the measurement system 1400 may further include a measurement object sensing unit configured to sense the position of the measurement object 200 transferred by the transfer unit 140 and to output position information including the sensed position. The measurement object sensing unit may include a position sensor or the like, but is not limited thereto.

Alternatively, the measurement system 1400 may further include a humid air exhaust port configured to exhaust the humid air sprayed from the humid air supply unit 120. When the measurement system 1400 includes a humid air exhaust port as described above, it is possible to reduce the possibility of occurrence of trouble or the like in the measurement system 1400 due to the humid air sprayed from the humid air supply unit 120.

Alternatively, when the image data of the measurement object 200 is acquired after the spraying of the humid air, there may occur a case in which too much fogging may occur on the surface of the measurement object 200 (that is, condensation of moisture particles is excessive) or too little fogging may occur (that is, condensation of moisture particles is insufficient), and thus, the measurement object 100 may not be measured accurately only with the acquired image data. The controller 160 may adjust the degree to which the humid air is mixed with the external air by adjusting the air volume of hot air sprayed from the air spraying unit 129 before the setting of the measurement system 1400, and may set the optimum air volume. That is, the control unit 1460 may control the air volume of sprayed humid air based on the temperature and humidity (i.e., the temperature/humidity sensing information) sensed by the temperature/humidity sensing unit 190.

Meanwhile, since consumers' criteria for product quality are increasing day by day, manufacturers make efforts to eliminate defective products in the production process, assembly process, intermediate process, and final assembly completion process of products. In order to eliminate the defects of the products, various inspection devices are used to determine whether a product is good or defective (NG).

For example, in order to verify the reliability of a board on which electronic components are mounted, it is necessary to check whether or not the board is properly manufactured before and after mounting the electronic components. As an example, it is possible to check whether or not solder is properly applied to the pad areas of the board before mounting the electronic components on the board, or to check whether the electronic components are properly mounted after the electronic components are mounted on the board.

In recent years, in order to precisely measure an inspection object (e.g., an electronic component) mounted on a board, a technique of measuring a two or three dimensional shape of the inspection object using a board inspection device has been used, in which the board inspection device includes at least one illumination unit configured to irradiate pattern illumination to the inspection object and an imaging unit configured to capture an image of the inspection object through the inspection of the pattern illumination and acquire image data. That is, the board inspection device irradiates the pattern illumination onto the surface of the substrate, receives light reflected or diffused from the surface of the measurement object, and measures the two or three dimensional shape of the surface of the measurement object.

Figure 16:
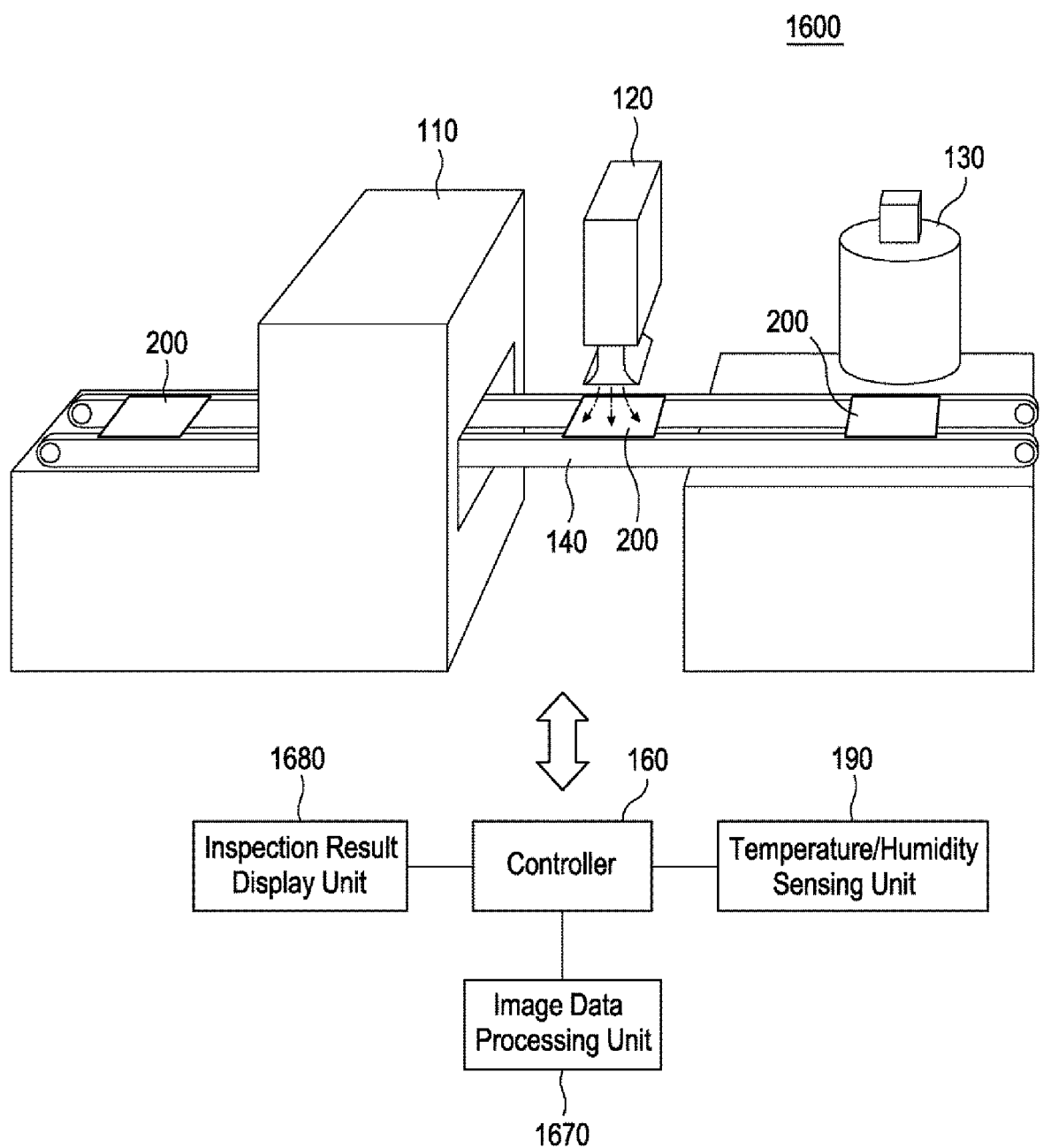
FIG. 16 is a perspective view schematically illustrating the configuration of an inspection device according to yet another embodiment of the present disclosure.

FIG. 16 illustrates an inspection device 1600 according to the present embodiment. For example, the inspection device 1600 may measure a two or three dimensional shape of a measurement object (e.g., a board) and check whether or not solder is properly applied to the pad areas of the board, or may inspect whether or not electronic components are properly mounted after the electronic components are mounted on the board. As another example, the inspection device 1600 may inspect the measurement object 200 by measuring the height, angle, roughness and the like of a part of the measurement object 200 and compare the height, angle, roughness and the like with predetermined inspection reference values.

The inspection system 1600 according to the present embodiment may include at least one of a cooling unit 110, a humid air supply unit 120, an image data acquisition unit 130, a transfer unit 140, a controller 160, and a temperature/humidity sensing unit 190. The cooling unit 110, the humid air supply unit 120, the image data acquisition unit 130, the transfer unit 140, the controller 160, and the temperature/humidity sensing unit 190 of the inspection device 1600 according to the present embodiment are similar to the cooling unit 110, the humid air supply unit 120, the image data acquisition unit 130, the transfer unit 140, the controller 160, and the temperature/humidity sensing unit 190 of the measurement system 700 of FIG. 1, and thus, a detailed description thereof will be omitted in the present embodiment.

The inspection device 1600 may further include an image data processing unit 1670. The image data processing unit 1670 may inspect the measurement object 200 according to a predetermined inspection standard based on the image data acquired by the image data acquisition unit 130, and may form an inspection result representing whether the measurement object 200 is good or defective (NG).

The inspection device 1600 may further include an inspection result display unit 1680. The inspection result display unit 1680 may display an inspection result formed by the image data processing unit 1670. For example, the inspection result display unit 1680 may include a liquid crystal display (LCD), a light-emitting diode (LED) display, and an organic light-emitting diode (OLED), but is not necessarily limited thereto.

Alternatively, the inspection device 1600 may further include a measurement object sensing unit configured to sense the position of the measurement object 200 transferred by the transfer unit 140 and to output position information including the sensed position. The measurement object sensing unit may include a position sensor or the like, but is not necessarily limited thereto.

Alternatively, the inspection device 1600 may further include a humid air exhaust port configured to exhaust the humid air sprayed from the humid air supply unit 120. When the inspection device 1600 includes a humid air exhaust port as described above, it is possible to reduce the possibility of occurrence of trouble or the like in the inspection device 1600 due to the humid air sprayed from the humid air supply unit 120.

FIG. 17 is a flowchart illustrating a procedure for performing inspection of a measurement object 200 by an inspection device according to an embodiment of the present disclosure.

The cooling unit 110 may cool the measurement object 200 to the first temperature (S1701). The first temperature may be set to a temperature that is equal to or lower than a dew point temperature at which dew condensation may occur on the surface of the measurement object 200 by applying the temperature and humidity of the humid air to the psychrometric chart. However, when the absolute amount of vapor of the humid air is sufficient even in a state in which the measurement object 200 is not cooled, the air around the surface of the measurement object 200 may go into a vapor-saturated or vapor-supersaturated state according to the psychrometric chart, in which case the cooling step (S1701) is not necessarily included.

The humid air supply unit 120 may form humid air by mixing hot air having a second temperature higher than the first temperature and moisture (S1702).

In addition, the humid air supply unit 120 may form moisture particles on the surface of the measurement object 200 by spraying the humid air onto the surface of the cooled measurement object 200 (S1703).

The inspection device 1600 may acquire image data by measuring the measurement object 200, on which moisture particles are formed, in order to inspect the measurement object 200 (S1704).

While the present disclosure has been described in connection with some embodiments thereof, it shall be understood that various modifications and variations may be made without departing from the spirit and scope of the present disclosure, which may be apparent to a person of ordinary skill in the art, to which the present disclosure belongs. It shall also be contemplated that such modifications and variations belong to the scope of the claims appended hereto.

What is claimed is:
1. A humid air forming device comprising:
a humid air supply unit configured to form humid air by mixing hot air having a temperature that is higher than a temperature of a measurement object with moisture, to spray the humid air to a surface of the measurement object, and to form moisture particles on the surface of the measurement object; and
a cooling unit configured to cool the measurement object, wherein the cooling unit includes:
a measurement object loading unit configured to load a plurality of measurement objects thereon;
a cold air forming unit configured to form cold air; and
a cold air supply pipe configured to connect the measurement object loading unit and the cold air forming unit, and to supply the cold air formed in the cold air forming unit into the measurement object loading unit.

2. The humid air forming device of claim 1, wherein the cooling unit further includes a cold air circulation pipe configured to connect the measurement object loading unit and the cold air forming unit and to circulate the cold air supplied to the measurement object loading unit to the cold air forming unit.

3. The humid air forming device of claim 1, wherein the humid air supply unit includes:
a hot air forming unit configured to form hot air;
a humidifying unit configured to form the moisture; and
a mixing unit configured to form the humid air by mixing the hot air and the moisture.

4. The humid air forming device of claim 3, wherein the mixing unit includes:

a case including a first inlet, into which the hot air flows, a second inlet, into which the moisture flows, and a discharge port through which the humid air is discharged; and a mixing pipe configured to have a plurality of through holes, through which the moisture that flows from the second inlet passes and to be connected with the first inlet and the discharge port, and to form the humid air by mixing the hot air that flows from the first inlet and the moisture passing through the through holes.

5. A humid air forming device comprising:

a humid air supply unit configured to form humid air by mixing hot air having a temperature that is higher than a temperature of a measurement object with moisture, to spray the humid air to a surface of the measurement object, and to form moisture particles on the surface of the measurement object; and a cooling base configured to cool and hold the measurement object, onto which the humid air is sprayed, wherein the cooling base includes:

a cooling element configured to cool the measurement object;

an upper plate installed above the cooling element, and configured to suck and hold the measurement object and to transfer heat of the measurement object to the cooling element; and a lower plate installed below the cooling element and configured to dissipate heat generated from the cooling element.

6. The humid air forming device of claim 5, wherein the cooling base further includes a suction unit configured to suck air through a plurality of perforations such that the measurement object is sucked and held on the upper plate.

7. A humid air forming device comprising:

a humid air supply unit configured to form humid air by mixing hot air having a temperature that is higher than a temperature of a measurement object with moisture, to spray the humid air to a surface of the measurement object, and to form moisture particles on the surface of the measurement object, wherein the humid air supply unit includes:

a wind path configured to circulate the humid air therein in a closed manner;

a humidifying unit configured to generate the moisture to be mixed with the humid air; and an air spraying unit configured to spray a part of the humid air circulating in the wind path onto the measurement object.

8. The humid air forming device of claim 7, wherein the humid air supply unit further includes a heater configured to heat the humid air circulating in the wind path to a temperature higher than a temperature of external air.

9. The humid air forming device of claim 8, wherein the humid air supply unit further includes a humid air sensing unit configured to sense a temperature and a humidity of the humid air, the humid air forming device further includes a controller configured to control formation and spraying of the humid air, and the controller controls driving of the heater and the humidifying unit based on the sensed temperature and humidity.

10. The humid air forming device of claim 8, further comprising:

a controller configured to control formation and spraying of the humid air, wherein the controller controls driving of the heater and the humidifying unit based on whether or not the air spraying unit is driven, or based on a number of times of driving of the air spraying unit.

11. The humid air forming device of claim 7, wherein the humid air supply unit further includes a mixing unit configured to mix the humid air and the moisture formed by the humidifying unit.

12. The humid air forming device of claim 7, wherein the humid air supply unit further includes an opening/closing unit configured to supply a part of the humid air, which is confined in the wind path, to the air spraying unit or to block the supply of the part of the humid air.

13. The humid air forming device of claim 7, wherein the humid air supply unit further includes a humid air buffer unit configured to receive and store a part of the humid air, which is confined in the wind path, and to supply the stored humid air to the wind path.

14. The humid air forming device of claim 7, wherein the humid air supply unit further includes an air circulation unit configured to circulate the humid air in the wind path.

15. An inspection device comprising:

a humid air forming device comprising a humid air supply unit configured to form humid air by mixing hot air having a temperature that is higher than a temperature of a measurement object and moisture, to spray the humid air onto a surface of the measurement object, and to form moisture particles on the surface of the measurement object and a cooling unit configured to cool the measurement object; and an image data acquisition unit configured to irradiate light to the measurement object, onto which the humid air is sprayed, to receive light reflected from the measurement object and to acquire image data of the measurement object, in order to inspect the measurement object, wherein the cooling unit includes:

a measurement object loading unit configured to load a plurality of measurement objects thereon;

a cold air forming unit configured to form cold air; and a cold air supply pipe configured to connect the measurement object loading unit and the cold air forming unit, and to supply the cold air formed in the cold air forming unit into the measurement object loading unit.

16. An inspection method performed by an inspection device, the method comprising:

loading, by a measurement Object loading unit of the inspection device, a measurement object;

forming, by a cold air forming unit of the inspection device, cold air;

cooling the measurement object by supplying the cold air formed in the cold air forming unit through a cold air supply pipe connected to the measurement object loading unit and the cold air forming unit;

forming humid air by mixing hot air having a temperature higher than a temperature of the measurement object and moisture;

forming moisture particles on a surface of the measurement object by spraying the humid air onto the surface of the measurement object; and acquiring image data by measuring the measurement object, on which the moisture particles are formed, in order to inspect the measurement object.

* * * * *